US010310799B2

(12) United States Patent
Kato

(10) Patent No.: US 10,310,799 B2
(45) Date of Patent: Jun. 4, 2019

(54) PROGRAM, INFORMATION PROCESSING SYSTEM, AND INFORMATION PROCESSING DEVICE FOR AUTOMATICALLY SETTING A LANGUAGE FOR A DISPLAY SCREEN WHEN BEING CONNECTED TO A TRANSMISSION TERMINAL

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 16 days.

(21) Appl. No.: 14/786,032

(22) PCT Filed: May 1, 2014

(86) PCT No.: PCT/JP2014/062538
§ 371 (c)(1),
(2) Date: Oct. 21, 2015

(87) PCT Pub. No.: WO2014/185362
PCT Pub. Date: Nov. 20, 2014

(65) Prior Publication Data
US 2016/0077783 A1 Mar. 17, 2016

(30) Foreign Application Priority Data
May 16, 2013 (JP) .................................. 2013-104512

(51) Int. Cl.
*G06F 3/147* (2006.01)
*H04N 7/14* (2006.01)
(52) U.S. Cl.
CPC ............. *G06F 3/147* (2013.01); *H04N 7/148* (2013.01)

(58) Field of Classification Search
CPC ........ G06F 3/147; G06F 3/0482; H04N 7/148
See application file for complete search history.

(56) References Cited

U.S. PATENT DOCUMENTS 6,879,408 B1 * 4/2005 Hori ...................... G06F 3/1204
358/1.11
2005/0225729 A1 * 10/2005 Kobayashi ............. G03B 21/26
353/30

(Continued)

FOREIGN PATENT DOCUMENTS

JP 10-151840 A 6/1998
JP 11-317921 11/1999

(Continued)

OTHER PUBLICATIONS

Extended European Search Report dated Apr. 4, 2016 in European Patent Application No. 14798068.4.

(Continued)

*Primary Examiner* — Stephen G Sherman
(74) *Attorney, Agent, or Firm* — Oblon, McClelland, Maier & Neustadt, L.L.P.

(57) ABSTRACT

A control for causing an information processing device connected to an apparatus to perform a method includes: acquiring from the apparatus a display setting representing a setting of display for one or more user interface components displayed by the apparatus; selecting, in response to the acquired display setting, one of display settings representing a setting of display for one or more user interface components displayed on a screen of the information processing device; and displaying the one or more user interface components on the screen of the information processing device in accordance with the selected display setting.

7 Claims, 26 Drawing Sheets

(56) References Cited

U.S. PATENT DOCUMENTS

| | | | |
|---|---|---|---|
| 2008/0016256 A1* | 1/2008 | Kumagai | G06F 3/005 |
| | | | 710/14 |
| 2008/0244397 A1 | 10/2008 | Ferlitsch | |
| 2009/0262387 A1 | 10/2009 | Sakakibara | |
| 2011/0058189 A1 | 3/2011 | Kuwamura | |
| 2013/0038676 A1 | 2/2013 | Tanaka et al. | |
| 2013/0242033 A1 | 9/2013 | Kato et al. | |
| 2014/0282007 A1* | 9/2014 | Fleizach | G06F 9/4446 |
| | | | 715/728 |
| 2014/0325360 A1* | 10/2014 | Jung | G06F 3/0482 |
| | | | 715/728 |
| 2015/0128054 A1 | 5/2015 | Sugimoto et al. | |

FOREIGN PATENT DOCUMENTS

| | | |
|---|---|---|
| JP | 2006-116851 | 5/2006 |
| JP | 2006-248151 A | 9/2006 |
| JP | 2008-200884 | 9/2008 |
| JP | 2010-206682 A | 9/2010 |
| JP | 2011-254453 | 12/2011 |
| JP | 2012-134941 | 7/2012 |
| JP | 2013-131161 | 7/2013 |

OTHER PUBLICATIONS

International Search Report dated Aug. 5, 2014 in PCT/JP2014/062538 filed on May 1, 2014.

Office Action dated May 16, 2017, in Japanese Patent Application No. 2013-104512.

\* cited by examiner

FIG.6

| STATUS | 0 | 1 | 2 | 3 | 4 |
|---|---|---|---|---|---|
| LANGUAGE SETTING | NOT YET | DONE | DONE | N/A | DONE OR N/A |
| FORMAT / TIME ZONE SETTING | NOT YET | NOT YET | DONE | N/A | DONE OR N/A |
| NETWORK SETTING | NOT YET | NOT YET | NOT YET | NOT YET | DONE |

FIG.7

| IP ADDRESS OF RELAY DEVICE | IMAGE QUALITY OF RELAYED IMAGE DATA (IMAGE QUALITY) |
|---|---|
| 1.3.2.4 | HIGH RESOLUTION |
| 1.3.1.3 | LOW RESOLUTION |
| 1.3.4.3 | MEDIUM RESOLUTION |
| ... | ... |

| 160 PIXELS | 320 PIXELS | 640 PIXELS |
| --- | --- | --- |
| 120 PIXELS | 240 PIXELS | 480 PIXELS |
| LOW RESOLUTION (a) | MEDIUM RESOLUTION (b) | HIGH RESOLUTION (c) |

| RELAY DEVICE ID | OPERATING CONDITION | RECEIPT DATE/TIME | IP ADDRESS OF RELAY DEVICE | MAXIMUM DATA TRANSMISSION SPEED (Mbps) |
| --- | --- | --- | --- | --- |
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.10

| TERMINAL ID | PASSWORD |
|---|---|
| 01aa | aaaa |
| 01ab | abab |
| 01ba | baba |
| ... | ... |

FIG.11

| TERMINAL ID | OPERATING CONDITION | RECEIPT DATE/TIME | TERMINAL IP ADDRESS |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.12

| SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.13

| SESSION ID FOR SELECTION | RELAY DEVICE ID | SOURCE TERMINAL ID | DESTINATION TERMINAL ID | DELAY TIME (ms) | DELAY INFORMATION RECEIPT DATE/TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.14

| DIFFERENCES IN DOT ADDRESS | PRIORITY LEVEL |
|---|---|
| SAME. SAME. SAME. DIFFERENT | 5 |
| SAME. SAME. DIFFERENT. — | 3 |
| SAME. DIFFERENT. —. — | 1 |
| DIFFERENT. —. —. — | 0 |

FIG.15

| MAXIMUM DATA TRANSMISSION SPEED AT RELAY DEVICE (Mbps) | TRANSMISSION SPEED PRIORITY LEVEL |
|---|---|
| 1000~ | 5 |
| 100~1000 | 3 |
| 10~100 | 1 |
| ~10 | 0 |

FIG.16

| DELAY TIME (ms) | IMAGE QUALITY OF IMAGE DATA (IMAGE QUALITY) |
|---|---|
| 0~100 | HIGH RESOLUTION |
| 100~300 | MEDIUM RESOLUTION |
| 300~500 | LOW RESOLUTION |
| 500~ | (SUSPEND) |

FIG.17

| LANGUAGE | UI STORAGE LOCATION |
|---|---|
| ja | http://www.domain.co.jp/ja/index.html |
| en | http://www.domain.co.jp/en/index.html |

FIG.19

| TABLE NUMBER | LANGUAGE ID | MENU ID | DISPLAY NAME |
|---|---|---|---|
| 1 | ja | BTN_IN_MEETING | 共有の開始 |
| | | BTN_SHARING | 共有の停止 |
| | | ... | ... |
| | | MSG_IN_MEETING | 画面を共有していません |
| | | MSG_SHARING | 画面を共有しています |
| | | ... | ... |
| 2 | en | BTN_IN_MEETING | Start Sharing |
| | | BTN_SHARING | Stop Sharing |
| | | ... | ... |
| | | MSG_IN_MEETING | Screen Share Off |
| | | MSG_SHARING | Screen Share On |
| | | ... | ... |
| ... | | | |

JAPANESE UI

ENGLISH UI

LANGUAGE ID = ja

LANGUAGE ID = en

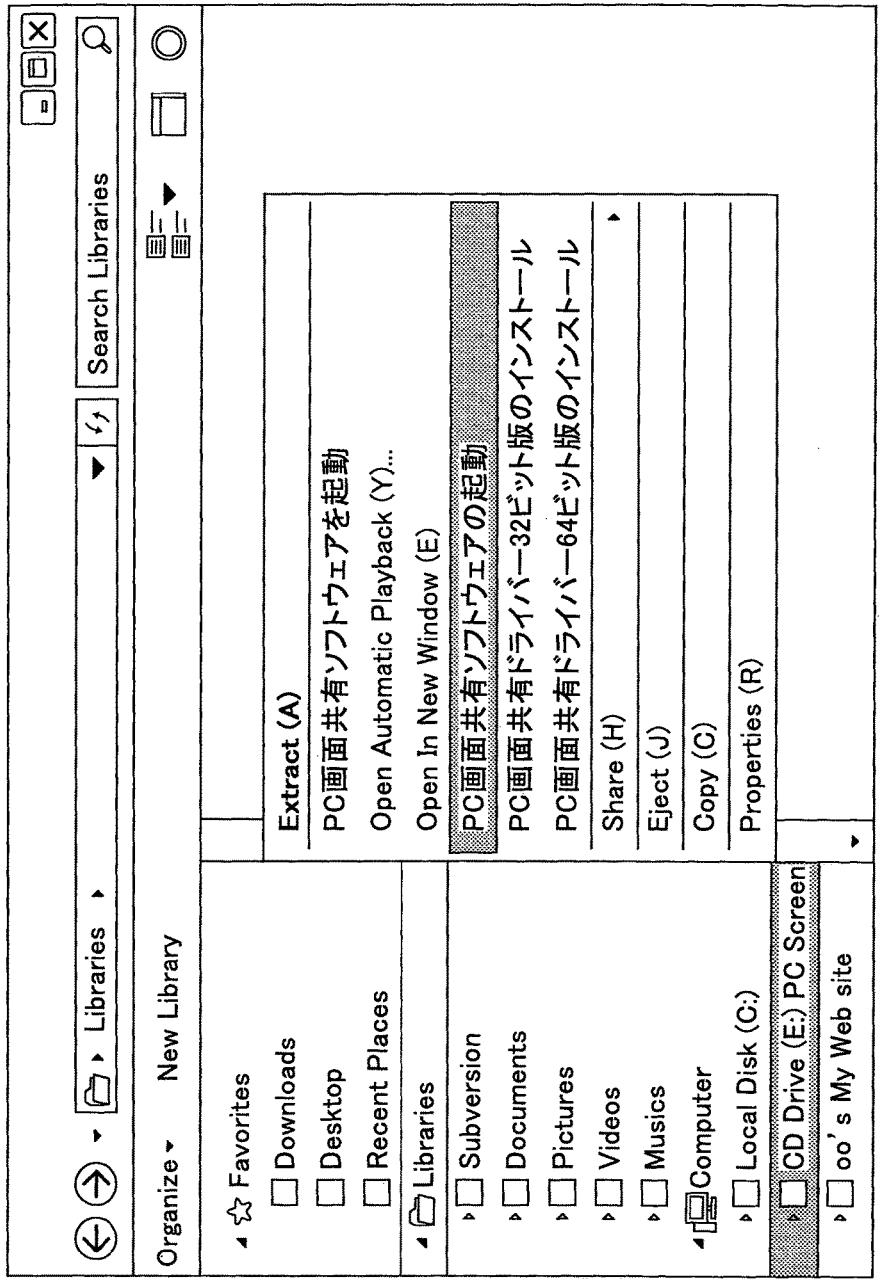

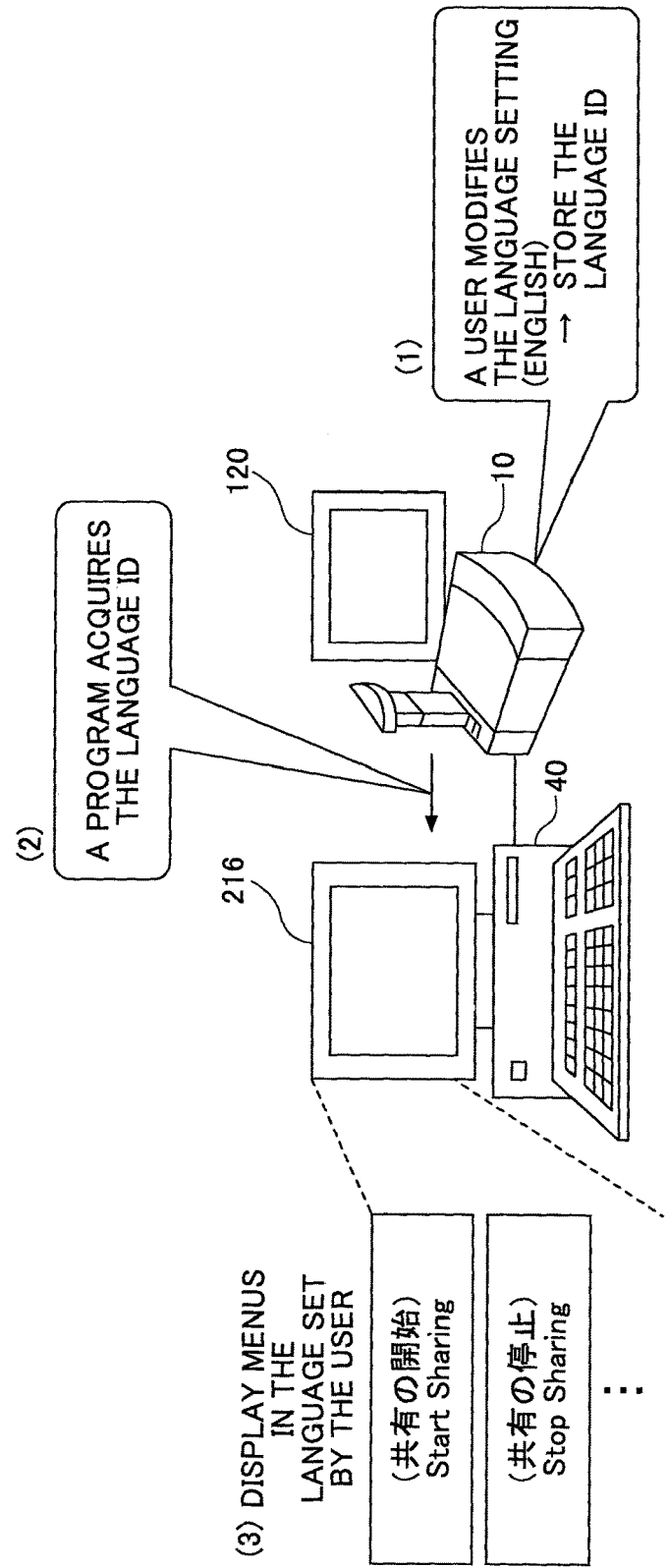

PROGRAM, INFORMATION PROCESSING SYSTEM, AND INFORMATION PROCESSING DEVICE FOR AUTOMATICALLY SETTING A LANGUAGE FOR A DISPLAY SCREEN WHEN BEING CONNECTED TO A TRANSMISSION TERMINAL

TECHNICAL FIELD

An aspect of this disclosure is related to a program, an information processing system, and an information processing device.

BACKGROUND ART

Recently, a remote conference system becomes popular to conduct a remote conference between separated places via a communication network such as the Internet.

In this kind of remote conference system, a transmission terminal (a terminal device) connected to the remote conference system captures images and collects sounds in a conference room where an attendee is. The transmission terminal converts the images and sounds into digital data, and transmits them to another transmission terminal. The other transmission terminal outputs the images and sounds with a display and a speaker to conduct the remote conference as if they are conducting a face-to-face meeting.

The remote conference system enables a predetermined device (e.g. an external input device) to transmit display data of documents used in the conference to other attendees. The other attendees may receive the display data to share the documents (see Patent Document 1). Patent Document 1 discloses the remote conference system which displays on a menu whether the display data displayed by the external input device is shared with the other terminals (i.e. attendees).

However, the conventional external input device is not able to automatically set its language setting of the menu into the language setting of the transmission terminal. The transmission terminal itself is able to display a menu etc. on a display or a projector screen. The transmission terminal supports many languages to show the menu for users in various countries. In general, it is easy for the user to read when both the language settings of the transmission terminal and the menu displayed on the external input device are identical. However, the conventional external input device requires the user to set the menu language separately from the language setting of the transmission terminal.

An embodiment of this invention aims to provide a program, an information processing system, and an information processing device, which solves the above-mentioned problems.

SUMMARY OF INVENTION

In one aspect, the present disclosure provides a program, an information processing system, and an information processing device which substantially eliminates one or more problems caused by the limitations and disadvantages of the related art.

In an aspect of this disclosure, there is provided a program for causing an information processing device connected to an apparatus to perform a method including acquiring from the apparatus a display setting representing a setting of display for one or more user interface components displayed by the apparatus; selecting, in response to the acquired display setting, one of display settings representing a setting of display for one or more user interface components displayed on a screen of the information processing device; and displaying the one or more user interface components on the screen of the information processing device in accordance with the selected display setting.

According to another embodiment of this invention, there is provided an information processing system including an information processing device; and an apparatus connected to the information processing device; wherein the apparatus includes a storage part configured to store a display setting representing a setting of display for one or more user interface components displayed by the apparatus; and wherein the information processing device includes an acquisition part configured to acquire from the apparatus the display setting; a selection part configured to select, in response to the acquired display setting, one of display settings representing a setting of display for one or more user interface components displayed on a screen of the information processing device; and a display part configured to display the one or more user interface components on the screen of the information processing device in accordance with the selected display setting.

According to another embodiment of this invention, there is provided an information processing device connected to an apparatus including an acquisition part configured to acquire from the apparatus a display setting representing a setting of display for one or more user interface components displayed by the apparatus; a selection part configured to select, in response to the acquired display setting, one of display settings representing a setting of display for one or more user interface components displayed on a screen of the information processing device; and a display part configured to display the one or more user interface components on the screen of the information processing device in accordance with the selected display setting.

BRIEF DESCRIPTION OF DRAWINGS

FIG. 6 is a diagram showing a table for storing status information.

FIG. 7 is a diagram showing an altered quality management table.

FIG. 10 is a diagram showing a terminal authentication management table.

FIG. 11 is a diagram showing a terminal management table.

FIG. 12 is a diagram showing a destination list management table.

FIG. 13 is a diagram showing a session management table.

FIG. 14 is a diagram showing an address priority management table.

FIG. 15 is a diagram showing a transmission speed priority management table.

FIG. 16 is a diagram showing a quality management table.

FIG. 17 is a diagram showing a language table.

FIG. 19 is a diagram showing a multi-language table DB.

FIG. 30A is a diagram showing a context menu depending on language IDs.

FIG. 31 is a diagram for explaining a process to switch a menu language displayed on the external input device according to the embodiment.

DESCRIPTION OF EMBODIMENTS

Figure 1:
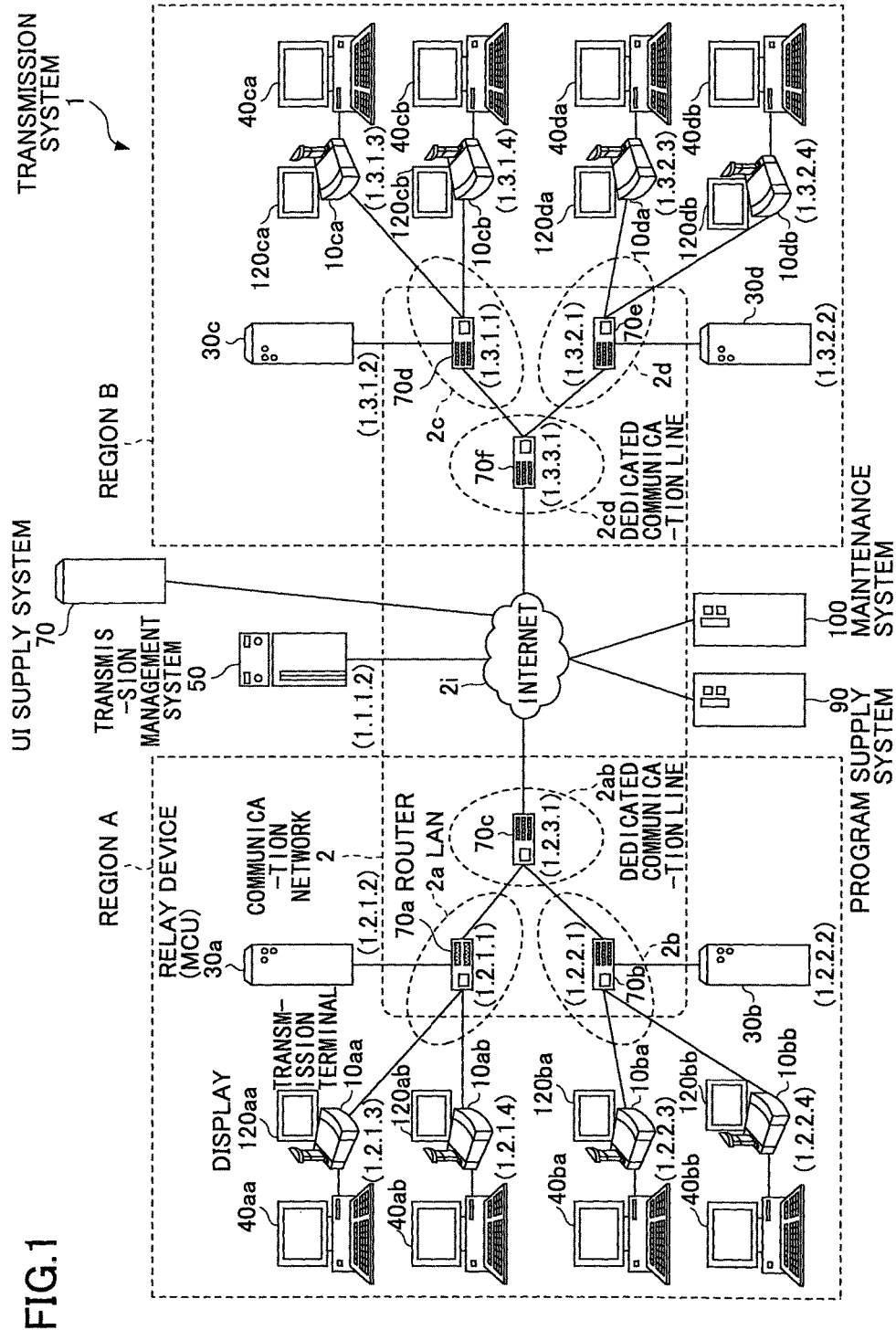
FIG. 1 is a drawing illustrating an overview of a transmission system according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

FIG. 31 is a diagram for explaining a process to switch a menu language displayed on an external input device 40 according to an embodiment of the present invention.

(1) A transmission terminal 10 and the external input device 40 are connected via a cable. A transmission terminal 10 receives image data and voice data from another transmission terminal (not shown) used by another party in a conference, which is connected via a network, and displays the image data on a display of the transmission terminal 10. The display 120 displays a screen including a menu which contains characters for user's operations to the transmission terminal 10. A user of the transmission terminal 10 may operate the menu directly while looking at the screen to configure the language of the menu displayed on the display 120 as his choice. The transmission terminal 10 may store in a non-volatile memory a language ID identifying the language the user set.

(2) When the external input device 40 detects an establishment of a connection with the transmission terminal 10, a program executed on the external input device 40 acquires the language ID from the transmission terminal 10.

(3) The program identifies the language set by the user based on the language ID, and sets the language of the menu displayed on the display 216 of the external input device 40 as the same language of the transmission terminal 10. For example, when the language set by the user is English, the menu shows an English item "Start_ Sharing" instead of Japanese item "共有の開始" and also shows "Stop_Sharing" instead of "共有の停止".

Therefore, the external input device 40 according to the embodiment may display the menu with the language which is identical to the one set for the transmission terminal 10 without a user's operation to set the language for the external input device 40.

In the following embodiment, the external input device 40 acquires the language ID from the transmission terminal 10. However, the user may set the language of the transmission terminal 10 with the external input device 40. In this case, the user may configure languages for both the external input device 40 and the transmission terminal 10 by a single operation.

However, such a configuration has the following disadvantage. While the user may configure the language for the transmission terminal 10 with the external input device 40, a priority control is required between the language set with the external input device 40 and the one directly set on the transmission terminal 10. In addition, security issues may occur when the transmission terminal 10 is configured for the language setting as well as other settings from external entities.

The external input device 40 according to the embodiment may solve the issues by reading the setting from the transmission terminal 10.

Overall Configuration of Transmission System

FIG. 1 is a drawing illustrating an overview of a transmission system according to an embodiment of this invention. With reference to FIG. 1, the overview of this embodiment is explained.

There are various types of transmission systems. One example may be a data providing system. In the data providing system, content data are transmitted from one terminal to another terminal via a transmission management system in a one-way direction. Another example may be an intercommunication system. The intercommunication system is utilized for mutually exchanging information or emotional expressions among two or more intercommunication terminals (i.e., the transmission terminals) via an intercommunication management system (i.e., the transmission management system). Examples of the intercommunication system include a videoconference system, a video telephony system, an audio conference system, a voice-call system, or a personal computer screen sharing system.

The following embodiment describes the transmission system, the transmission management system, and the transmission terminals by conceptualizing the TV conference or videoconference system as an example of the intercommunication system, the TV conference or videoconference management system as an example of the intercommunication management system, and the TV conference or videoconference terminal as an example of the intercommunication terminal. Thus, the transmission terminal and the transmission management system according to the embodiment may be applied to not only the TV conference or videoconference system but the communication system or the transmission system.

As shown in FIG. 1, the transmission system 1 includes two or more transmission terminals (10aa, 10ab, . . . , 10db), displays (120aa, 120ab, . . . , 120db) for the transmission terminals, external input devices (40aa, 40ab, 40ba, 40bb, 40ca, 40cb, 40da, and 40db) connected to the transmission terminals, two or more relay devices (30a, 30b, 30c, 30d), a transmission management system 50, a UI supply system 70, a program supply system 90, and a maintenance system 100.

Note that in this embodiment, any one of the transmission terminals (10aa, 10ab, . . . , 10db) may be referred to as "transmission terminal 10", any one of the displays (120aa, 120ab, . . . , 120db) may be referred to as "display 120", any one of the external input devices (40aa, . . . , 40db) may be referred to as "external input device 40", and any one of the relay devices (30a, 30b, 30c, 30d) may be referred to as "relay device 30". In FIG. 1, the transmission terminal 10 and the display 120 have separate components. However, they are integrated into a single component (the transmission terminal 10 includes the display 120). When the transmission terminal 10 and the display 120 are integrated into the single component, they may provide a projection function for projecting images.

The transmission terminal 10 is configured to transmit and receive image data and sound data to/from other transmission terminals 10. In this embodiment, video data is used as the image data. However, still image data may also be used. Furthermore, the image data may include both the video data and the still image data. The relay device 30 is configured to relay the image data and the voice data for the transmission terminals 10. The transmission management system 50 is configured to manage the transmission terminal 10 and the relay device 30 in an integrated fashion.

The external input device 40 is configured to connect with the transmission terminal 10, and transmits display data displayed on a display device (i.e. the display 216 stated later) of the external input device 40. The external input device 40 and the transmission terminal 10 may be connected with a USB cable or a LAN cable. The external input device 40 and the transmission terminal 10 may be connected with wireless technologies such as Bluetooth™, a wireless LAN, infrared, or an IC communication.

Routers (70a, 70b . . . 70f) shown in FIG. 1 are configured to select optimal paths for the content data. Note that in this embodiment, any one of the routers (70a, 70b . . . 70f) may be referred to as "router 70". The program supply system 90 includes a not-illustrated hard disk (HD) configured to store programs for the transmission terminal 10, with which the transmission terminal 10 may implement various functions or various parts, and transmit the programs for the transmission terminal to the transmission terminal 10. The HD of the program supply system 90 is configured to further store programs for the relay device 30, with which the relay device 30 implements various functions or various parts, and transmits the programs for the relay device to the relay device 30. In addition, the HD of the program supply system 90 is configured to store transmission management programs, with which the management system 50 implements various functions or various units, and transmit the transmission management programs to the management system 50.

As shown in FIG. 1, the transmission terminal 10aa, the transmission terminal 10ab, the relay device 30a, and the router 70a are connected via a LAN 2a so that they may communicate with each other. The transmission terminals 10ba, 10bb, the relay device 30b, and the router 70b are connected via a LAN 2b so that they may communicate with each other. The LAN 2a and the LAN 2b are connected by a dedicated line 2ab including a router 70c so that they communicate with each other. The LAN 2a is set up in a predetermined area A, and the area A may be Japan, for example. The LAN 2a may be set up in an office in Tokyo, and the LAN 2b may be set up in an office in Osaka.

Meanwhile, the transmission terminals 10ca, 10cb, the relay device 30c, and the router 70d are connected via a LAN 2c so that they may communicate with each other. The terminals 10da, 10db, the relay device 30d, and the router 70d are connected via a LAN 2d so that they may communicate with each other. The LAN 2c and the LAN 2d are connected by a dedicated line 2cd including a router 70f so that they communicate with each other, and the LAN 2c and the LAN 2d are set up in predetermined area B. For example, the area B may be USA, the LAN 2c may be is set up in an office in New York, and the LAN 2d may be set up in an office in Washington, D.C. The area A and the area B are connected from the routers (70c, 70f) via the Internet 2i so that the area A and the area B are mutually in communication via the Internet 2i.

The transmission management system 50 and the program supply system 90 are connected to the terminals 10 and the relay devices 30 via the Internet 2i so that they may communicate with each other. Alternatively, the transmission management system 50 and the program supply system 90 may be located in the area A or the area B, or may be located in an area other than the areas A and B.

Note that in this embodiment, the communication network 2 is made up of the LAN 2a, the LAN 2b, the dedicated line 2ab, the Internet 2i, the dedicated line 2cd, the LAN 2c, and the LAN 2d.

In the communication network 2 of FIG. 1, the set of four numbers attached under each of the transmission terminals 10, the relay devices 30, the transmission management system 50, the routers 70, and the program supply system 90 simply indicates an IP address under the typical IPv4 (Internet Protocol version 4). For example, the IP address of the transmission terminal 10aa is "1.2.1.3" as shown in FIG. 1. Alternatively, IP addresses under IPv6 may be used instead of IP addresses under IPv4. However, in this embodiment, IPv4 is used for simplifying the illustration.

Hardware Configuration of Transmission System

Next, a hardware configuration of the transmission system 1 according to the embodiment will be described.

Figure 2:
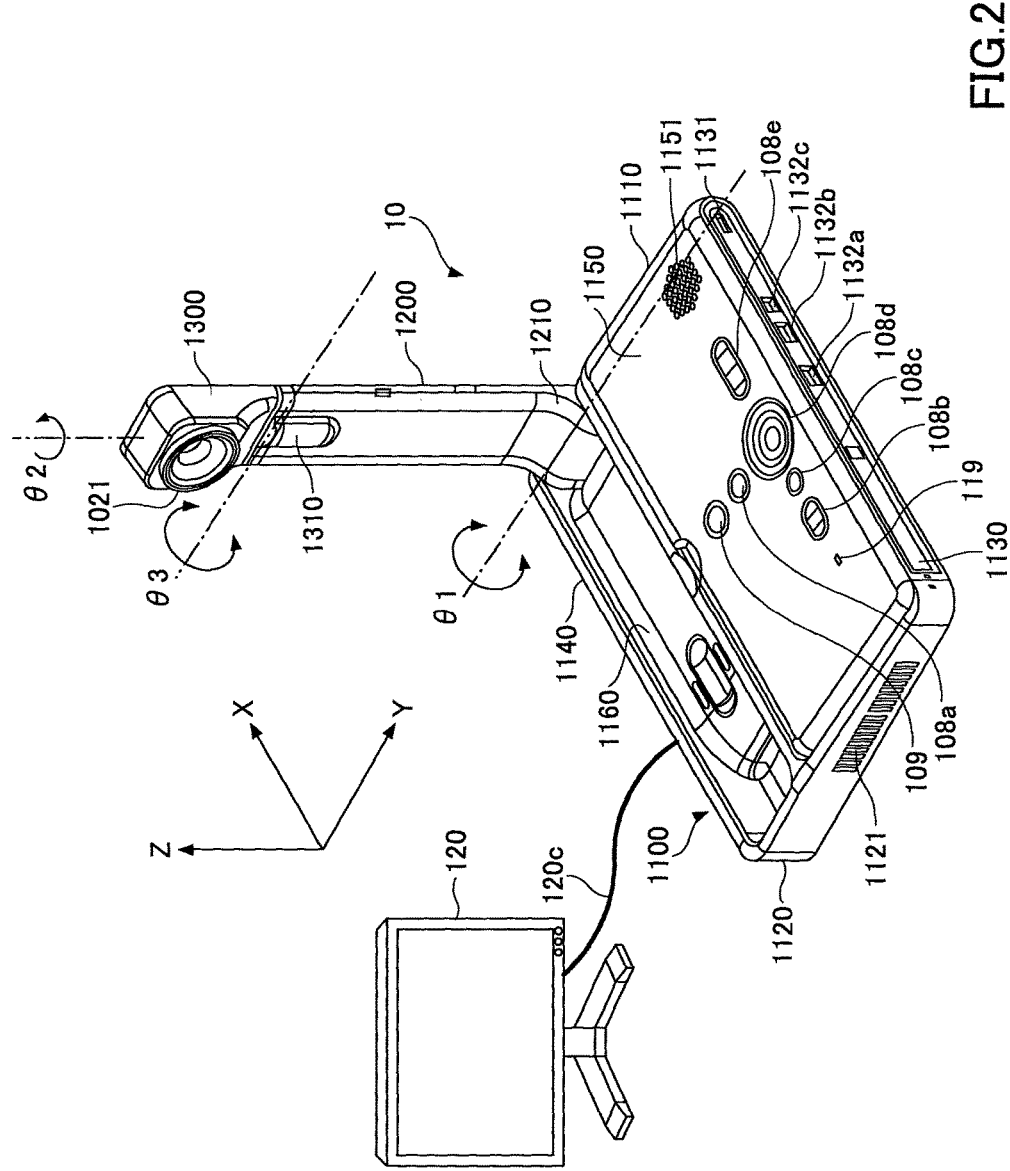
FIG. 2 is a perspective view of a transmission terminal according to the embodiment.

FIG. 2 is a perspective view of the transmission terminal 10 according to the embodiment. Hereinafter, an X-axis direction represents a longitudinal direction of the transmission terminal 10, a Y-axis direction represents a direction perpendicular to the X-axis direction in a horizontal direction, and a Z-axis direction represents a direction perpendicular to the X-axis direction and the Y-axis direction (i.e., vertical direction).

As shown in FIG. 2, the terminal 10 includes a housing 1100, an arm 1200, and a camera housing 1300. A front wall face 1110 of the housing 1100 includes a not-illustrated air intake surface which is formed of air intake holes, and a rear wall face 1120 of the housing 1100 includes an exhaust surface 1121 which is formed of exhaust holes. Accordingly, the transmission terminal 10 may take in external air behind the transmission terminal 10 via the not-illustrated air intake surface and exhaust the air inside the transmission terminal 10 via the exhaust surface 1121 by driving a cooling fan arranged inside the housing 1100. A right wall face 1130 of the housing 1100 includes a sound-collecting hole 1131, via which a built-in microphone 114 is able to collect audio sound, such as voice, sound, or noise.

The right wall face 1130 of the housing 1100 includes an operation panel 1150. The operation panel 1150 includes operation buttons (108a-108e), a later-described power switch 109, a later-described alarm lamp 119, and a sound output face 1151 formed of sound output holes for outputting sound from a later-described built-in speaker 115. Further, a left wall face 1140 of the housing 1100 includes a recessed seat unit 1160 for accommodating an arm 1200 and a camera housing 1300. The right wall face 1130 of the housing 1100 further includes connection ports (1132a-1132c) for electrically connecting cables to the later-described external device connection IF (interface) 118. On the other hand, the left wall face 1140 of the housing 1100 further includes a not illustrated connection port for electrically connecting a display connecting cable 120c for the display 120 to the later-described external device connection IF (interface) 118.

Note that in the following, any one of the operation buttons (108a-108e) may be called an "operation button 108" and any one of the connection ports (1132a-1132c) may be called a "connection port 1132".

Next, the arm 1200 is attached to the housing 1100 via a torque hinge 1210 such that the arm 120 is movable in upward and downward directions within a tilt-angle θ1 range of 135 degrees with respect to the housing 1100. The arm 1200 shown in FIG. 2 is arranged at a tilt angle θ1 of 90 degrees.

A built-in camera 1021 is arranged in the camera housing 1300 and the camera 1021 is configured to take images of a user, documents, a room, etc. The camera housing 1300 further includes a torque hinge 1310. The camera housing 1300 is attached to the arm 1200 via the torque hinge 1310. The camera housing 1300 is rotatably attached to the arm 1200 in the up/down and right/left directions via the torque hinge 1310 such that the camera housing 1300 is movable in a pan-angle θ2 range of ±180 degrees and a tilt-angle θ3 range of ±45 degrees based on the assumption that the pan and tilt angles shown in FIG. 2 are both 0.

Note that external displays of the relay device 30, the management system 50, and the program supply system 90 are all similar to the display of a typical server computer, and their descriptions are therefore omitted.

Figure 3:
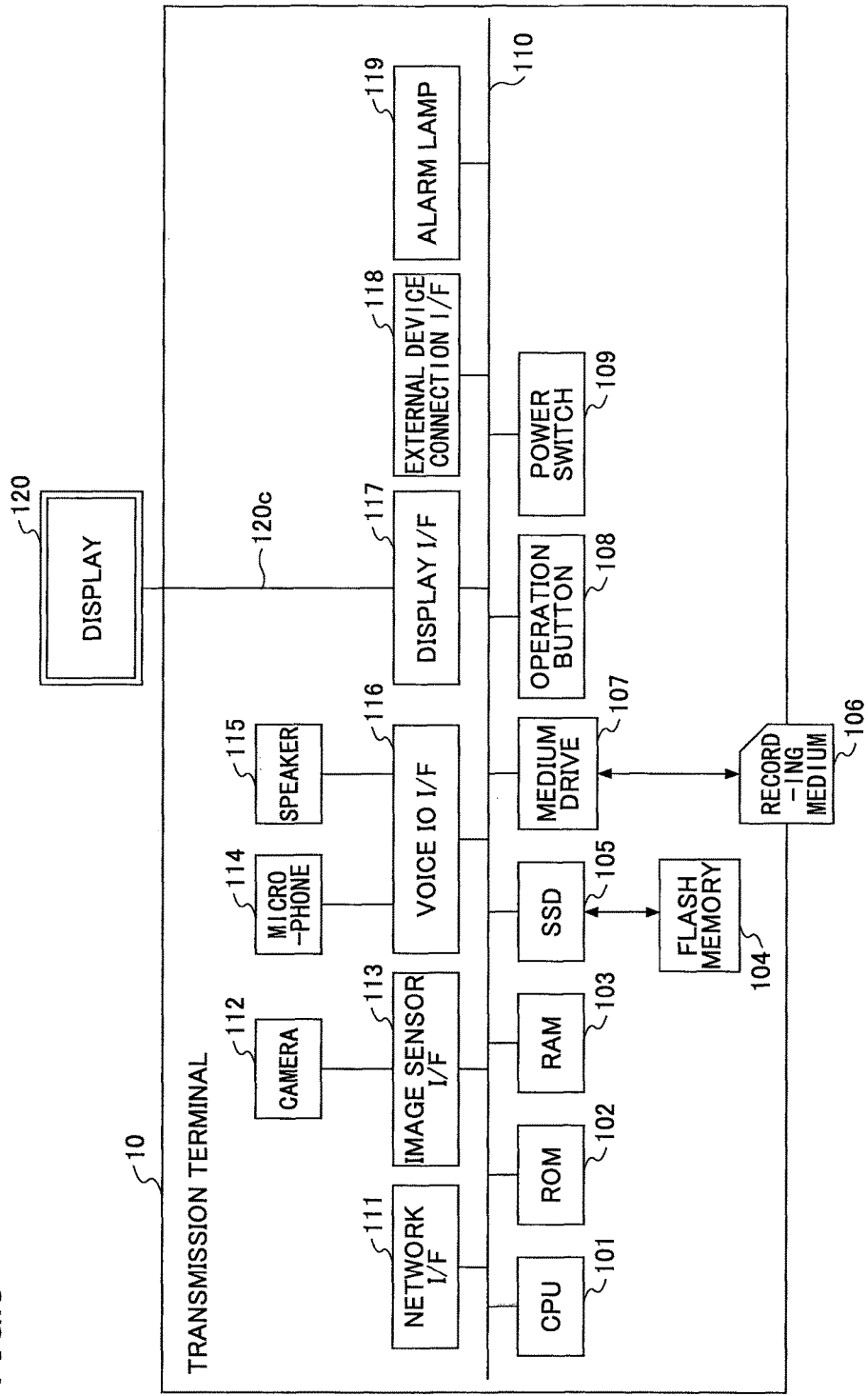
FIG. 3 is a diagram showing a hardware configuration of the transmission terminal according to the embodiment.

FIG. 3 is a diagram showing the hardware configuration of the transmission terminal 10 according to the embodiment. As shown in FIG. 3, the transmission terminal 10 according to the embodiment includes a central processing unit (CPU) 101 configured to control overall operations of the transmission terminal 10, a read-only memory (ROM) 102 storing programs for the transmission terminal 10, a random access memory (RAM) 103 used as a work area of the CPU 101, a flash memory 104 configured to store various data, such as image data and voice data, a solid state drive. (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, the operation button 108 operated by a user for selecting an address of the transmission terminal 10, the power switch 109 for switching ON/OFF of the power of the transmission terminal 10, and a network interface (IF) 111 for transmitting data utilizing the communication network 2. In addition, the transmission terminal 10 further includes a built-in camera 112 configured to image a subject based on the control of the CPU 101, an image sensor interface (IF) 113 configured to control driving of the camera 112, the built-in microphone 114 configured to pick up audio sound, the built-in speaker 115, a voice input/output interface (I/O IF) 116, a display interface (IF) 117 configured to transmit image data to the external display 120 based on the control of the CPU 101, the external device connection interface (IF) 118 configured to connect various external devices, the alarm lamp 119 configured to inform the user of various functional problems of the transmission terminal 10, and a bus line 110 such as an address bus or a data bus for electrically connecting the elements and devices with one another.

The display 120 is a display unit formed of liquid crystal or an organic EL material configured to display images of the subject or icons for operating the transmission terminal 10. Further, the display 120 is connected to the display IF 117 via the cable 120c. The cable 120c may be an analog RGB (VGA) cable, a component video cable, a high-definition multimedia interface (HDMI) (R) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connection IF 118 may be connected via a universal serial bus (USB) cable with external devices, such as the external camera, the external microphone, and the external speaker. The USB cable is inserted in the connection port 1132 of the housing 1100 shown in FIG. 2. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

Note that the storage medium 106 is removable from the transmission terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The camera 112 may be a solid-state image sensor configured to convert light into electric charges to produce digital images (videos) of the subject. CMOS may be used for imaging objects besides CCD. The display 120 may be a liquid crystal or organic EL which may display the object images and operational icons.

The above-described programs for the transmission terminal may be recorded in an installable format or in an executable format on a computer-readable recording medium such as the storage medium 106 to distribute the medium.

Figure 4:
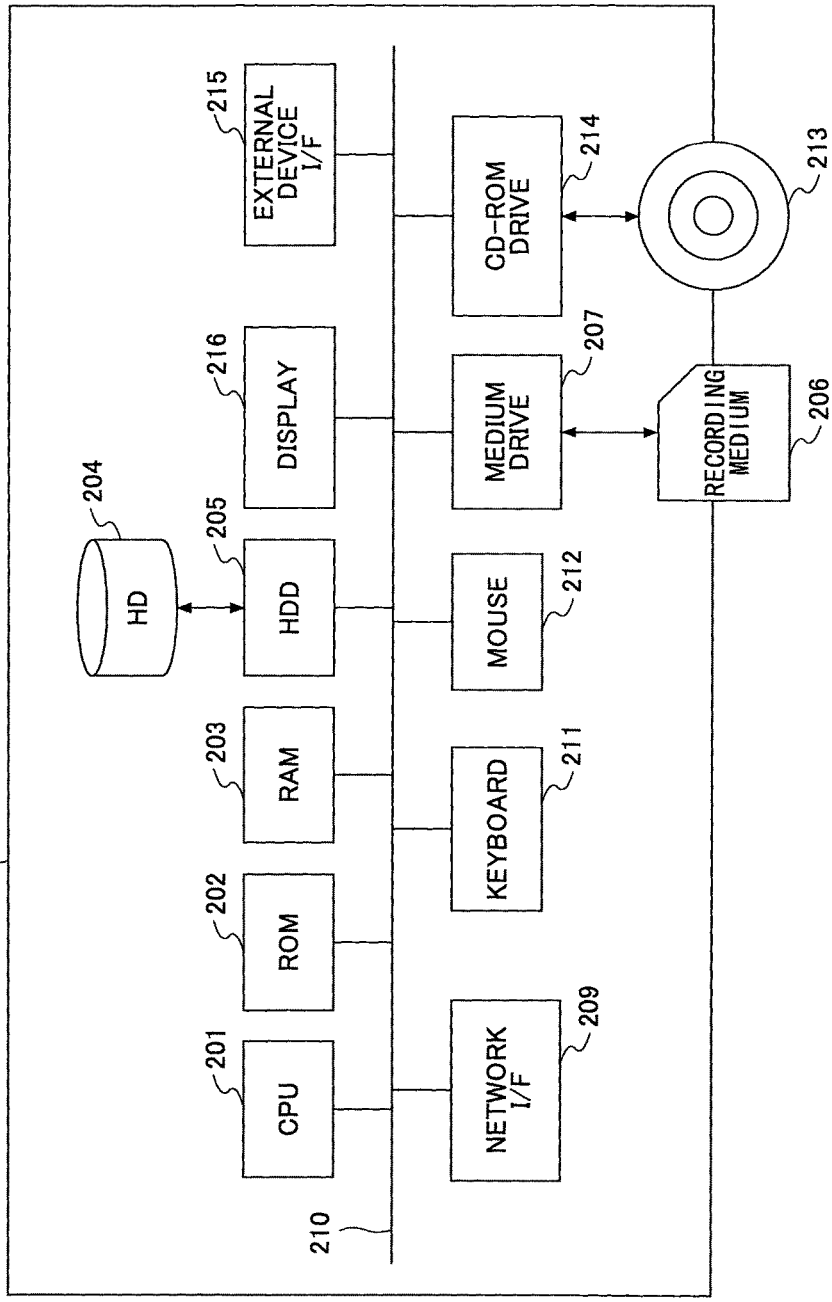
FIG. 4 is a diagram showing a hardware configuration of a transmission management system, a relay device, a program supply system, a UI supply system, or an external input device according to the embodiment.

FIG. 4 is a diagram showing the hardware configuration of the transmission management system 50 according to the embodiment. The transmission management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 216 configured to display various information such as a cursor, menus, windows, characters and images, a network interface (IF) 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, an external device interface (IF) 215 configured to communicate information with an external device, and a bus line 210 such as an address bus or a data bus for electrically connecting the elements and devices with one another shown in FIG. 4. The display 216 is an example of a display unit of the external input device 40.

Note that the above-described programs for the management system may be in an installable format or in an executable format on a computer-readable recording medium such as the storage medium 206 or the CD-ROM 213 to distribute the medium.

Further, the external input device 40 has a hardware configuration similar to that of the transmission management system 50, and a description of the hardware configuration of the relay device 30 will be omitted. Note that the ROM 202 may store programs for controlling the external input device 30. In this case, the programs for the external input device may also be recorded in an installable format or in an executable format on a computer-readable recording medium such as the storage medium 206 or the CD-ROM 213 to distribute the medium.

Further, the relay device 30 has a hardware configuration similar to that of the transmission management system 50, and a description of the hardware configuration of the relay device 30 will be omitted. Note that the ROM 202 may store programs for controlling the relay device 30. In this case, the programs for the relay device may also be recorded in an installable format or in an executable format on a computer-readable recording medium such as the storage medium 206 or the CD-ROM 213 to distribute the medium.

Further, the UI supply system 70 has a hardware configuration similar to that of the transmission management system 50, and a description of the hardware configuration of the UI supply system 70 will be omitted. Note that the ROM 202 may store programs for controlling the UI supply system 70. In this case, the programs for the relay device may also be recorded in an installable format or in an executable format on a computer-readable recording medium such as the storage medium 206 or the CD-ROM 213 to distribute the medium.

Furthermore, the program supply system 90 has a hardware configuration similar to that of the transmission management system 50, and a description of the hardware configuration of the program supply system 90 will be omitted. Note that the ROM 202 may store programs for controlling the program supply system 90. Also In this case, the programs for the program supply system 90 may also be recorded in an installable format or in an executable format on a computer-readable recording medium such as the storage medium 206 or the CD-ROM 213 to distribute the medium.

The maintenance system 100 is a computer configured to keep, manage, or maintenance conditions for at least one of the transmission terminals 10, the relay devices 30, the transmission management system 50, and the program supply system 90. For example, when the maintenance system 100 is deployed in a country and at least one of the transmission terminals 10, the relay devices 30, the transmission management system 50, and the program supply system 90 is deployed in another country, the maintenance system 100 is configured to keep, manage, or maintenance conditions for at least one of the transmission terminals 10, the relay devices 30, the transmission management system 50, and the program supply system 90 via a communication network 2 remotely.

In addition, the maintenance system 100 is configured to manage a model number, a serial number, a sales destination, a maintenance record, or a failure history of at least one of the transmission terminals 10, the relay devices 30, the transmission management system 50, and the program supply system 90.

Furthermore, each of the program supply system 90 and the maintenance system 100 has a hardware configuration similar to that of the transmission management system 50, and a description of the hardware configuration of the maintenance system 100 will be omitted. Note that the HD 204 may store programs for controlling the program supply system 90 or maintenance system 100. Also in this case, the programs for the program supply system 90 or the maintenance system 100 may also be recorded in an installable format or in an executable format on a computer-readable recording medium such as the storage medium 206 or the CD-ROM 213 to distribute the medium. Alternatively, the programs for the program supply system 90 or the maintenance system 100 may be recorded in not the HD 204 but the ROM 202.

Note that other examples of the removable recording medium include a compact disc recordable (CD-R), a digital versatile disk (DVD), and a Blu-ray Disc (BD).

Functional Configuration of Transmission System

Figure 5:
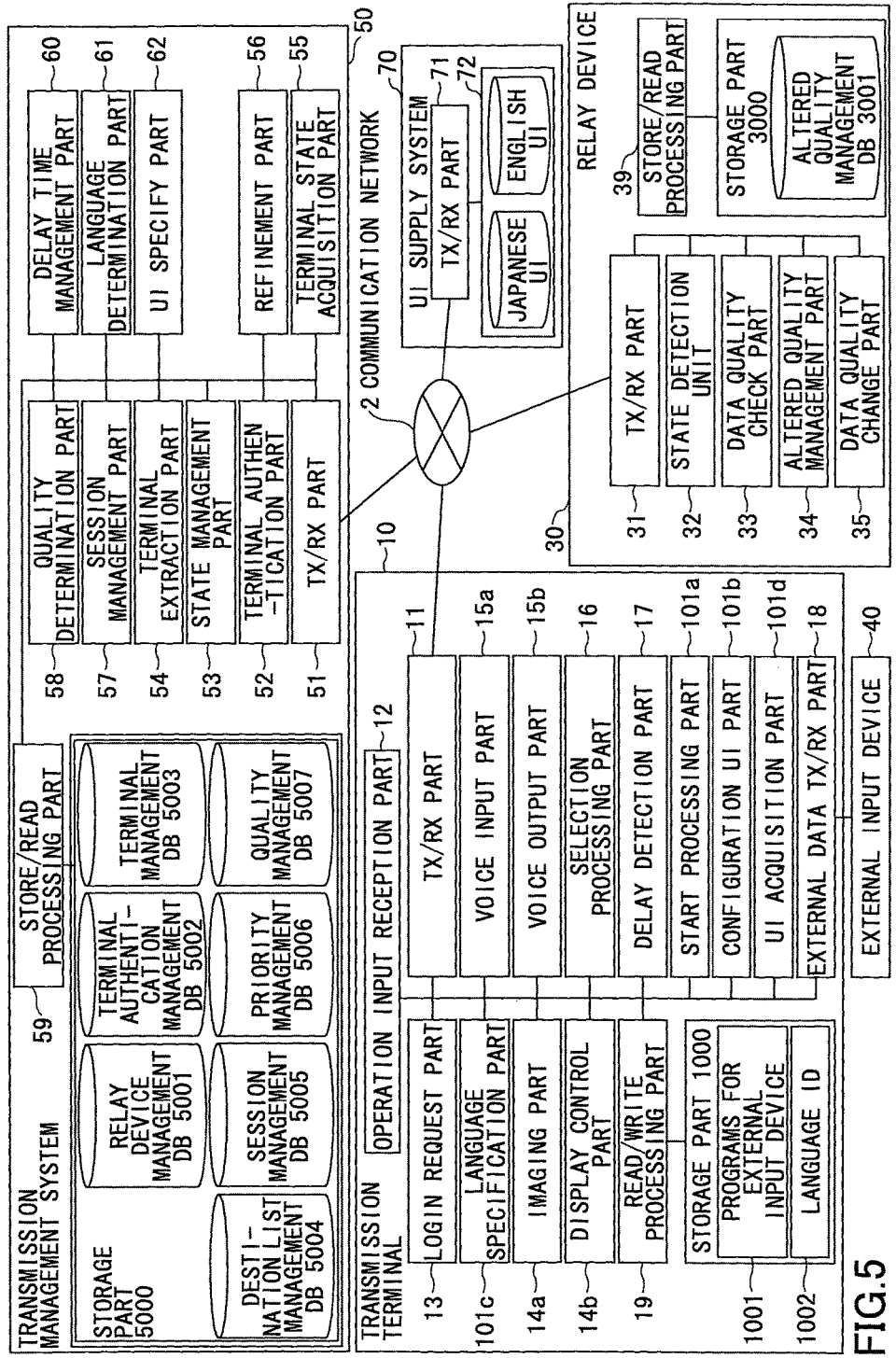
FIG. 5 is a block diagram showing a functional configuration of each terminal, device, and system included in the transmission system according to the embodiment.

Next, a functional configuration of the transmission system 1 according to the embodiment will be described. FIG. 5 is a block diagram showing a functional configuration of the transmission terminal 10, the relay device 30, the transmission management system 50, and the UI supply system 70 which constitute the transmission system 1 according to the embodiment. As shown in FIG. 5, the transmission terminal 10, the relay device 30, the transmission management system 50, and the UI supply system 70 are connected via the communication network 2 so that they carry out data communications with one another via the communication network 2.

Functional Configuration of Transmission Terminal

The transmission terminal 10 includes transmitter/receiver (TX/RX) part 11, an operation input reception part 12, a login request part 13, an imaging part 14a, a display control part 14b, a voice input part 15a, a voice output part 15b, a selection processing part 16, a delay detection part 17, a read/write processing part 19, a start processing part 101a, a configuration UI part 101b, a language specification part 101c, a UI acquisition part 101d, and an external data TX/RX part 18. These parts represent functions or units implemented by any of the elements and devices shown in FIG. 3, which are activated by the instructions from the CPU 201 based on the programs stored in the ROM 202. Further, the transmission terminal 10 includes a storage part 1000 formed of the SSD 105 shown in FIG. 3.

Functional Parts of Terminal

Next, the functional parts of the transmission terminal 10 will be described in more detail. The transmitter/receiver part 11 of the terminal 10 is configured to transmit various data (information) to and receive such data from other transmission terminals, devices and systems via the communication network 2. The function of the transmitter/receiver part 11 is implemented by the network IF 111 shown in FIG. 3. The function of the operation input reception part 12 is implemented by the operation button 108 and the power switch 109 shown in FIG. 3, and the operation input receiving unit 12 configured to receive various inputs from a user. For example, when the user switches ON the power switch 109 shown in FIG. 3, the operation input receiving unit 12 shown in FIG. 5 receives a power-ON signal to switch ON the power of the transmission terminal 10. The login request part 13 is configured to automatically transmit a login request indicating that the user desires to login and a current IP address of the transmission terminal 10 to the transmission management system 50 via the communication network 2 when the power-ON signal is received by the operation input reception part 12 as a trigger. The function of the login request part 13 is implemented by instructions from the CPU 101 shown in FIG. 3.

The imaging part 14a is configured to take an image of a subject and output image data of the subject, and the function of the imaging part 14a is implemented by instructions received from the CPU 101 shown in FIG. 3 and also by the camera 112 and the image sensor IF 113 shown in FIG. 3.

The display control part 14b is configured to control transmission of image data to the external display 120, and the function of the display control part 14b is implemented by the display IF 117 shown in FIG. 3.

The voice input part 15a is configured to input audio data of the audio signal obtained by the microphone 114 that converts voice of the user into the audio signal and output the audio data according to the audio signal. The function of the voice input part 15a is implemented by the voice input/output IF 116 shown in FIG. 3.

The selection processing part 16 is configured to select one of the relay devices 30.

The delay detection part 17 is configured to detect a delay time (ms) of the image data or the voice data transmitted from other transmission terminal 10 via the relay device 30, and the function of the delay detection part 17 is implemented by instructions from the CPU 101 shown in FIG. 3. The read/write processing part 19 is configured to store various data in the storage part 1000 or retrieve various data stored in the storage part 1000, and the function of the read/write processing part 19 is implemented by the SSD 105 shown in FIG. 3. The storage part 1000 stores the programs 1001 for the external input device, the language ID 1002, the terminal ID (identification) to identify the transmission terminal 10, a password (not shown), the relay device ID to identify the relay device 30 transmitting image data (not shown), voice data, and various kinds of data, and an IP address of other transmission terminals (e.g. later-described destination terminals) (now shown).

The start processing part 101a is configured to read status information from the storage part 1000 when the transmission terminal 10 is turned on, and determines a mode to start depending on the status. FIG. 6 is a diagram showing a table for storing status information. In the example, the status information includes three kinds of items including "Language setting", "Format/time zone setting", and "Network setting", and five statues are defined from "0" through "4". Each status represents the following status.

"0": Initial status

"1": Only the language setting has been done

"2": "Language setting" and "Format/time zone setting" have been done

"3": Initial configuration is skipped on a first startup (set before shipping)

"4": All settings including "network setting" have been finished.

Referring back to FIG. 5, the configuration UI part 101b is configured to provide a user interface for various settings (e.g. the language setting, the format/time zone setting, the network setting, etc.), and accepts a user's operations in a startup process performed by the start processing part 101a.

The language specification part 101c is configured to specify a language configured in the startup process (stored in the storage part 1000) when a login request is transmitted to the transmission management system 50.

The UI acquisition part 101d is configured to acquire UI information for defining a UI such as hypertext markup language (html), JavaScript™, cascading style sheet, etc. from the UI supply system 70 which is designated in a response from the transmission management system 50.

When the transmission terminal 10 has the UI information, the language specification part 101c may be omitted. The UI acquisition part 101d may acquire the UI information from the internal storage.

The terminal ID or the relay device ID are identifications including any characters, symbols, or signs used to identify the transmission terminal 10 or the relay device 30, respectively. The identification may be any combination of the characters, symbols, and signs. Hereinafter, a transmission terminal 10 which requests for starting a video conference is called "source terminal 10A", and another transmission terminal 10 which may start the video conference responding to the request from the source terminal 10A is called "destination terminal 10B".

Functional Parts of Relay Device

Next, functional parts of the relay device 30 will be described. The relay device 30 may have a transmitter/receiver (TX/RX) part 31, a state detection part 32, a data quality check part 33, an altered quality management part 34, a data quality change part 35, and store/read processing part 39. Note that in the following, the functions of the relay device 30 are described in association with the main element and devices for implementing the parts of the relay device 30 shown in FIG. 4. The relay device 30 also has a storage part 3000 implemented by the HD 204 as shown in FIG. 4.

Altered Quality Management Table

The storage unit 3000 includes an altered quality management DB (database) 3001 formed of an altered quality management table shown in FIG. 7. FIG. 7 is a diagram showing the altered quality management table. The altered quality management table includes IP addresses of the relay devices 30 used as relay destination terminals in association with image quality of the image data relayed by the respective devices 30.

Herein, the resolution of the image data treated in this embodiment will be described with reference to FIG. 8. FIG. 8(a) represents a base image used as a low-resolution image formed of 160×120 pixels. FIG. 8(b) represents a medium-resolution image formed of 320×240 pixels. FIG. 8(c) represents a high-resolution image formed of 640×480 pixels. When the image data are relayed via a narrow-bandwidth path, the low-resolution image data used as the base image are relayed. When the image data are relayed via a relatively wide bandwidth path, the low-resolution image data used as the base image and the medium-resolution image data exhibiting medium image quality are relayed. When the image data are relayed via an extremely wide bandwidth path, the low-resolution image data used as the base image, the medium-resolution image data exhibiting the medium image quality, and the high-resolution image data exhibiting high image quality are relayed. As in the altered quality management table shown in FIG. 7, if, for example, the relay device 30 relays the image data to the destination terminal having an IP address "1.3.2.4", the quality of the image data relayed is a "high image quality".

Functional Parts of Relay Device

Next, functional parts of the relay device 30 will be described. Note that in the following, the functions of the relay device 30 are described in association with the main element and devices for implementing the parts of the relay device 30 shown in FIG. 3.

The transmitter/receiver part 31 of the relay device 30 is configured to transmit various data (information) to and receive such data from other terminals, devices and systems via the communication network 2. The function of the transmitter/receiver part 31 is implemented by the network IF 209 shown in FIG. 4. The state detection part 32 is configured to detect an operating condition of the relay device 30 having this state detection part 32. The function of the state detection part 32 is implemented by instructions from the CPU 201 shown in FIG. 4. The operating condition includes "Online", "Offline", and "Out of order".

The data quality check part 33 is configured to search the altered quality management table (FIG. 7) by the IP address of the destination terminal as a search key to extract the corresponding quality of the relayed image data, and confirms the quality of the relayed image data. The function of the data quality check part 33 is implemented by instructions from the CPU 201 shown in FIG. 4. The altered quality management part 34 is configured to modify the content of the altered quality management table in the altered quality management DB 3001 based on the quality information transmitted from the transmission management system 50 (described later). The function of the altered quality management part 34 is implemented by instructions from the CPU 201 shown in FIG. 4. For example, during a video conference with high resolution image data between a source terminal using terminal ID "01aa" (terminal 10aa) and a destination terminal using terminal ID "01db" (terminal 10db), when a delay occurs in transferring the image data due to the start of another video conference between a source terminal 10bb and a destination terminal 10ca via the communication network 2, the relay device 30 needs to degrade the quality of the image data which has been relayed from high resolution to medium resolution. In such situation, the altered quality management part 34 modifies the content of the altered quality management table in the altered quality management DB 3001 so that the quality for the image data that the relay device is relaying decreases from high resolution to medium resolution based on the quality information representing medium resolution.

The data quality change part 35 is configured to change the quality of the image data transferred from a source terminal 10 based on the content of the altered quality management table of the altered quality management DB 3001. The function of the data quality change part 35 is implemented by instructions from the CPU 201 shown in FIG. 4. The read/write processing part 39 is configured to store various data in the storage part 3000 or retrieve various data stored in the storage part 3000, and the function of the read/write processing part 39 is implemented by the HDD 205 shown in FIG. 4.

Functional Configuration of Management System

Next, functions and parts of the transmission management system 50 will be described. The transmission management system 50 includes a transmission/receive (TX/RX) unit 51, a terminal authentication part 52, a state management part 53, a terminal extraction part 54, a terminal state acquisition part 55, a refinement part 56, a session management part 57, a quality determination part 58, a read/write processing part 59, a delay time management part 60, a language determination part 61, and a UI specification part 62. These units represent functions and units implemented by any of the elements and devices shown in FIG. 4, which are activated by instructions from the CPU 201 based on the programs stored in the ROM 202. Further, the transmission management system 50 includes a storage part 5000 formed of the HD 204 shown in FIG. 4.

Relay Device Management Table

Figures 8, 9:
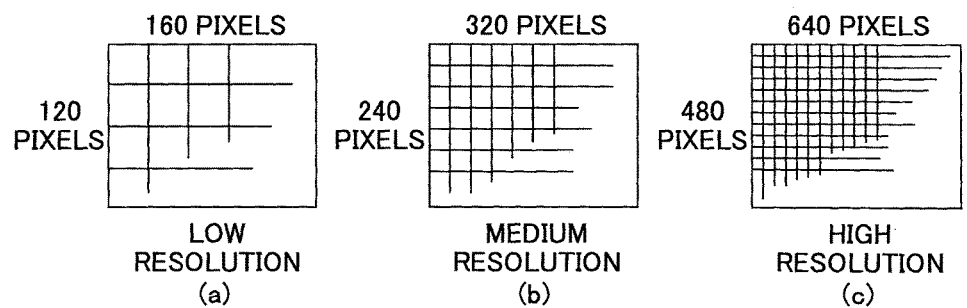
FIG. 8 is a diagram showing resolutions of image data.
FIG. 9 is a diagram showing a relay device management table.

The storage part 5000 includes a relay device management DB 5001 formed of a relay device management table shown in FIG. 9. In the relay device management table, the relay device IDs of the relay devices 30 are associated with the operating condition of the relay devices 30, the receipt date/time at which the state information indicating the operating condition of the relay devices 30 are received by the transmission management system 50, the IP addresses of the relay devices 30, and the maximum data transmission speeds (Mbps) of the relay devices 30. For example, in the relay device management table shown in FIG. 9, the relay device ID "111a" of the relay device 30a is associated with the operating state "Online" of the relay device 30a, the receipt date/time "13:00 Nov. 10, 2009" at which the state information of the relay device 30a is received by the management system 50, the IP address "1.2.1.2" of the relay device 30a, and the maximum data transmission speed 100 Mbps of the relay device 30a.

Terminal Authentication Management Table

The non-volatile storage part 5000 includes a terminal authentication management DB 5002 formed of a terminal authentication management table shown in FIG. 10. In the terminal authentication management table, passwords are individually associated with the terminal IDs of all the transmission terminals 10 managed by the transmission management system 50. For example, in the terminal authentication management table shown in FIG. 10, the terminal ID "01aa" of the terminal 10aa is associated with the password "aaaa".

Terminal Management Table

The storage part 5000 includes a terminal management DB 5003 formed of a terminal management table shown in FIG. 11. In the terminal management table, terminal IDs of the transmission terminals 10 are associated with operating conditions of the transmission terminals 10, receipt date/time at which the later-described login request information is received by the transmission management system 50, and IP addresses of the transmission terminals 10. For example, in the terminal management table shown in FIG. 11, the terminal 10aa using the terminal ID "01aa" is in an operating condition "Online". In addition, the receipt date/time when a login request information is received by the transmission management system 50 is "2009.11.10 13:40" (1:40 p.m., Nov. 10, 2009), and the IP address of the terminal 10aa is "1.2.1.3".

Destination List Management Table

The storage part 5000 includes a destination list management DB 5004 formed of a destination list management table shown in FIG. 12. In the destination list management table, terminal IDs of source terminals 10A that request initiation of a video conference communication are individually associated with terminal IDs of destination terminals 10B registered as potential destination terminals 10. For example, in the destination list management table shown in FIG. 12, the terminal ID "01aa" of the source terminal 10aa is associated with a list of terminal IDs of potential destination terminals 10B which the source terminal 10aa requests to initiate the video conference communication, the potential destination terminals 10B including the terminal 10ab having a terminal ID "01ab", the 10ba having a terminal ID "01ba", and the terminal 10db having a terminal ID "01db". The potential destination terminals 10B may be added or deleted based on instructions from the source terminal 10A to the management system 50.

Session Management Table

The storage part 5000 includes a session management DB 5005 formed of a session management table shown in FIG. 13. In the session management table, session IDs that identify sessions in which the communication data are transmitted and received between the terminals are associated with the relay device IDs of the relay devices 30 utilized for relaying the image data and the audio data, the terminal ID of the source terminal 10A, the terminal IDs of the destination terminals 10B, delay time (ms) in receiving the image data by the destination terminals 10B, and receipt date/time at which the delay information indicating the delay time transmitted from each of the destination terminals 10B is received by the transmission management system 50. For example, in the session management table illustrated in FIG. 13, the relay device 30a (having the relay device ID "111a") selected for executing the session having the session ID "se1" is associated with the request source terminal 10aa having the terminal ID "01aa" that has a video conference with the destination terminal 10db having the terminal ID "01db". The session management table indicates that the delay time is 200 ms in receiving the image data by the destination terminal 10db at the receipt date/time "2009.11.10 14:00" (2:00 p.m., Nov. 10, 2009). Note that if the video conference is conducted between the two transmission terminals 10, the receipt date/time of the delay information may be managed not based on the destination terminals 10B but based on the delay information transmitted from the source terminal 10A. However, if the video conference is conducted between three or more transmission terminals 10, the receipt date/time of the delay information may be managed based on the delay information transmitted from the transmission terminals 10 on the reception side of the image data and the audio data.

Address Priority Management Table

The storage part 5000 includes an address priority management DB 5006 formed of an address priority management table shown in FIG. 14. In the address priority management table, differences of an IP address separated into four octets with dots are associated with priority levels. The higher priority level is defined for the IP address for the higher octet of which is similar. For example, in the address priority management table as shown in FIG. 14, when the first octet through third octet of the IP address are similar, the priority level is "5". When the first octet and the second octet are similar, the priority level is "3". In this case, the value of the fourth octet does not affect the priority level. When only the first octet is similar, the priority level is "1". In this case, the third octet and the fourth octet do not affect the priority level. When only the first octet is different, the priority level is "0". In this case, the second octet through fourth octet do not affect the priority level.

Transmission Speed Priority Management Table

The storage part 5000 includes an address priority management DB 5006 formed of an address priority management table shown in FIG. 15. In the transmission speed priority management table, maximum data transmission speeds at relay device 30 are associated with the transmission speed priority levels. The higher transmission speed priority level is defined for the higher maximum data transmission speed. For example, in the transmission speed priority management table as shown in FIG. 1, when the maximum data transmission speed is greater than or equal to 1000 Mbps, the transmission speed priority level is "5". When the maximum data transmission speed is greater than or equal to 100 Mbps and less than 1000 Mbps, the transmission speed priority level is "3". When the maximum data transmission speed is greater than or equal to 10 Mbps and less than 100 Mbps, the transmission speed priority level is "1". When the maximum data transmission speed is less than 10 Mbps, the transmission speed priority level is "0".

Quality Management Table

The storage part 5000 further includes a quality management DB 5007 formed of a quality management table shown in FIG. 16. In the quality management table, the delay time (ms) of the image data in the source terminal or the destination terminal is associated with the image quality (quality of image) of the image data relayed by the relay device 30.

Functional Parts of Transmission Management System

Next, functional parts of the transmission management system 50 will be described. Note that in the following, the functions of the transmission management system 50 are described in association with the main element and devices for implementing the parts of the transmission management system 50 shown in FIG. 4.

The transmitter/receiver part 51 of the management system 50 is configured to transmit various data (information) to and receive the data from other terminals, relay devices and systems via the communication network 2. The function of the transmitter/receiver unit 51 is implemented by the network IF 209 shown in FIG. 4. The terminal authentication part 52 is configured to search the terminal authentication management table (the terminal authentication management DB 5002) of the storage unit 5000 by the terminal ID and the password received via the transmitter/receiver unit 51 as search keys, and authenticate the corresponding terminal based on whether the terminal ID and the password contained in the login request information are identical to those managed in the terminal authentication management table. In order to manage the operating condition of the source terminal 10A which transmits a login request, the state managing unit 53 is configured to store the terminal ID of the source terminal 10A, the operating condition of the source terminal 10A, the receipt date/time at which the login request information is received by the transmission management system 50, and the IP address of the source terminal 10A in the terminal management table (FIG. 11) while associating them.

The terminal extraction part 54 is configured to search the destination list management table (FIG. 12) by the terminal ID of the source terminal 10A which has sent the login request as a search key, and retrieve the terminal IDs of the potential destination terminals 10B capable of communicating with the source terminal 10A. Further, the terminal extraction part 54 is configured to search the destination list management table by the terminal ID of the target terminal as a search key, and extract terminal IDs of other terminals 10 which have registered the above terminal ID of the target terminal as a potential destination terminal.

The terminal state acquisition part 55 is configured to search the terminal management table (FIG. 11) by terminal IDs of the candidate destination terminals extracted by the terminal extraction part 54 as search keys, and retrieve the operating conditions and the communication statuses for the terminal IDs. Thus, the terminal state acquisition part 55 receives the operating condition of the potential destination terminals 10B capable of communicating with the source terminal 10A which has sent the login request. Further, the terminal state acquisition part 55 is configured to search the terminal management table (FIG. 11), and acquires the operating condition of the source terminal 10A which has sent the login request.

The refinement part 56 is configured to support a final refinement process to select the one of the relay devices 30.

The session management part 57 is configured to store and manage the session management table (FIG. 13) of the storage part 5000 by associating the session IDs for selection with the terminal ID of the source terminal and the terminal ID of the destination terminal. Further, the session management part 57 is configured to store and manage the relay device ID of the relay device 30 finally selected for every session ID in the session management table (FIG. 13).

The quality determination part 58 is configured to search the quality management table (FIG. 16) by the delay time as a search key, extract the image quality of the corresponding image data, and determine the image quality of the image data relayed by the relay device 30. The read/write processing part 59 is configured to store various data in the storage part 5000 and retrieve various data from the storage part 5000. The function of the read/write processing part 59 is implemented by the HDD 205 shown in FIG. 4. The delay time managing part 60 is configured to search the terminal management table (FIG. 11) by the IP address of the destination terminal 10B as a search key, and extract the corresponding terminal ID. Further, the delay time managing part 60 is configured to store the delay time indicated by the delay information in a delay time field of the record corresponding to the extracted terminal ID in the session management table (FIG. 13).

The language determination part 61 is configured to determine a language responding to the language specified in the login request sent by the transmission terminal 10.

The UI specification part 62 is configured to transmit to the transmission terminal 10 an address of the UI supply system 70 with which the UI information may be acquired based on the language determined by the language determination part 61. FIG. 17 shows an example of the language table kept by the UI specification part 62. In the language table, languages including "ja" (Japanese) and "en" (English) are associated with the address of the UI supply system 70 with which the UI information may be acquired. The address specifies the UI supply system 70 as well as the UI information.

When the transmission terminal 10 has the UI information, both the language determination part 61 and the UI specification part 62 may be omitted.

Functional Configuration of UI Supply System

With reference to FIG. 5, the transmission terminal 70 includes a transmitter/receiver (TX/RX) part 71 and UI information 72. The transmitter/receiver part 71 is configured to communicate information with the transmission terminal 10. In response to a request for transmitting the UI information from the transmission terminal 10, the transmitter/receiver part 71 is configured to refer to the UI information 72, and transmits the UI information 72 to the transmission terminal 10.

Functional Configuration of External Input Device

Figure 18:
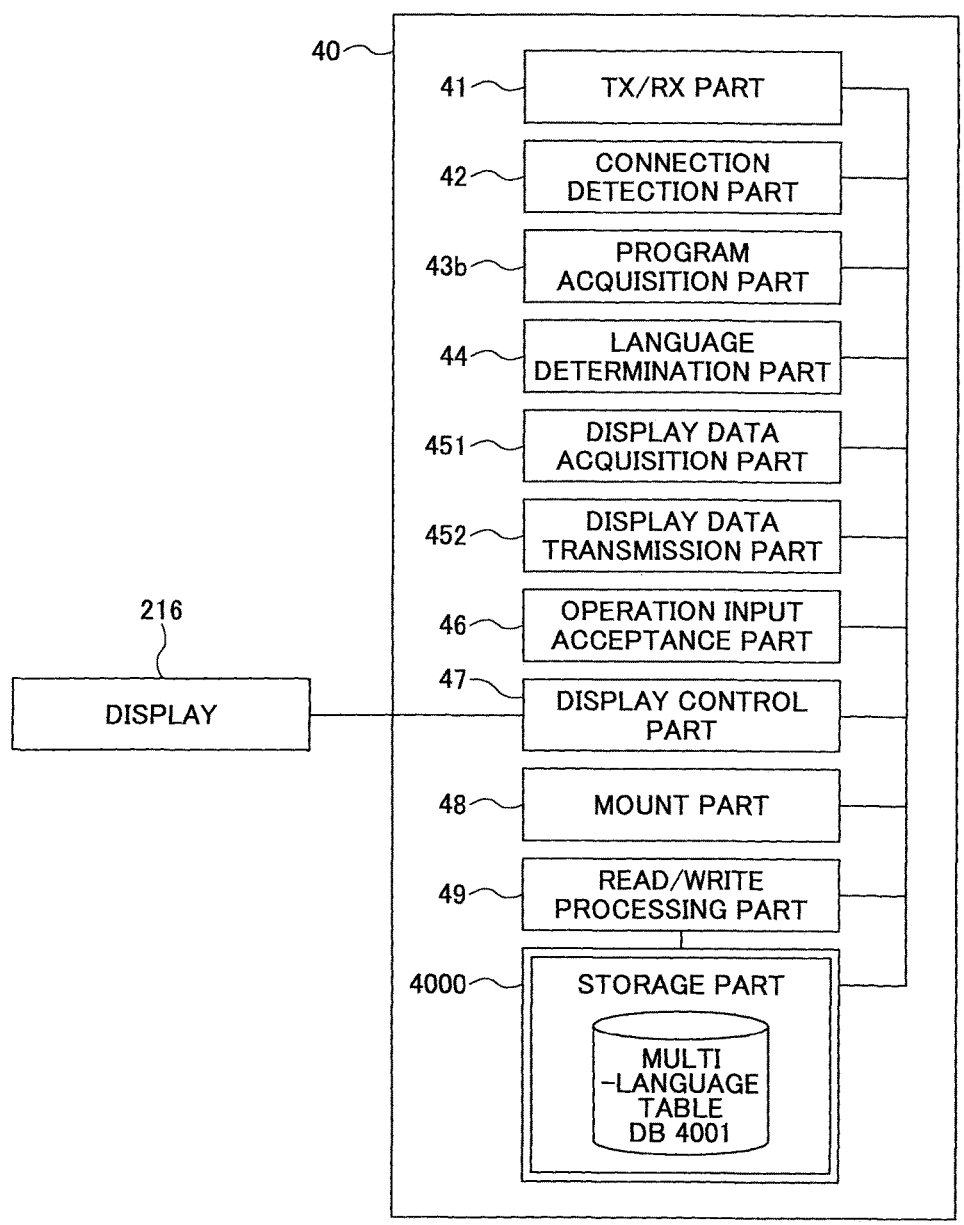
FIG. 18 is a block diagram showing a functional configuration of an external input device according to the embodiment.

FIG. 18 is a block diagram showing a functional configuration of an external input device according to the embodiment. As shown in FIG. 18, the external input device 40 includes a transmitter/receiver (TX/RX) part 41, a connection detection part 42, a program acquisition part 43b, a language determination part 44, a display data acquisition part 451, a display data transmission part 452, an operation input acceptance part 46, a display control part 47, a mount part 48, and a read/write processing part 49. These parts represent functions or parts implemented by any of the elements shown in FIG. 18, which are activated by instructions from the CPU 201 based on the programs stored in the ROM 202. One or more functions are provided by the programs for the external input device which are downloaded and installed from the storage part 1000 of the transmission terminal 10 (FIG. 5). The external input device 40 includes a storage part 4000 formed of the ROM 202, RAM 203, or HDD 205 shown in FIG. 3. The storage part 4000 stores a menu screen to show a menu and a multi-language table DB 4001.

The external input device 40 is an information processing device such as a PC, a tablet, a smart phone, a personal data assistant (PDA). The external input device 40 works with an operating system (OS) such as Windows™, Mac™ OS, Mac™ OS X Lion, iOS™, Android™, etc. so that the external input device 40 executes the programs for the external input device when other devices are connected.

Functional Parts of External Input Device

Next, functional parts of the external input device 40 will be described. First, the transmitter/receiver part 41 of the external input device 40 (FIG. 18) is configured to communicate various kinds of data (information) with the transmission terminal 10. The transmitter/receiver part 41 is configured to communicate with the transmission terminal 10 to transmit or receive various kinds of data. The connection detection part 42 is configured to detect that the transmission terminal 10 is connected via the external device I/F 215 shown in FIG. 3, and also detects that the transmission terminal 10 is ready to communicate with the external input device 40.

The program acquisition part 43b is configured to acquire the programs for the external input device 40 from the storage part 1000 of the transmission terminal 10 (FIG. 5).

The operation input acceptance part 46 is configured to accept information input by the user. The display control part 47 is configured to display a menu screen which is loaded by the later-described read/write processing part 49. The menu screen is an example of a user interface described in the later-mentioned claims.

The mount part 48 is configured to mount the storage part 1000 of the transmission terminal 10. In this way, the external input device 40 may install the programs for the external input device. Alternatively, the external input device 40 may use the program by extracting the programs into the RAM 203 without such installation.

The display data acquisition part 451 is configured to acquire display data which is to be displayed on the display 216 of the external input device 40. The display data transmission part 452 is configured to transmit the display data acquired by the display data acquisition part 451 to the transmission terminal 10.

The language determination part 44 is configured to obtain a language ID from the transmission terminal 10 to determine the language for characters, numbers, and signs displayed on the display 216 by referring to the multi-language table DB 4001. Note that the numbers and signs may differ depending on the language, and their format may also differ (e.g. Arabic number, Roman number, Greece number, India number, etc.). The display control part 47 is configured to display a menu with the determined language.

The read/write processing part 49 is configured to store various data in the storage part 4000 or retrieve various data stored in the storage part 4000, and the function of the read/write processing part 19 is implemented by the HDD 205 shown in FIG. 3.

Multi-Language Table

The storage part 4000 forms a multi-language table DB 4001 which stores a multi-language table as shown in FIG. 19. The multi-language table DB 4001 is downloaded from the transmission terminal 10.

In the multi-language table DB, a language ID, a menu ID, and a display name are associated and stored for each multi-language table. Thus, when the external input device 40 may identify the language ID configured for the transmission terminal 10, the external input device 40 may change the language used for each menu.

The language ID is an identification to identify a language. The language ID is an example of a setting value described in the later-mentioned claims. The menu ID is an identification to identify a menu (given items and contents). The display name, a screen in which the menu, and a position of the menu may be identified by the menu ID. The display name includes characters, signs, numbers, or any combination of them, which forms each menu. In particular, the display name is stored as character codes according to a character code table such as Unicode. Alternatively, the image data indicated in the "display name" as shown in FIG. 19 may be converted into bitmap data.

Process/Operation of Embodiment

Fundamental Operation

Figure 20:
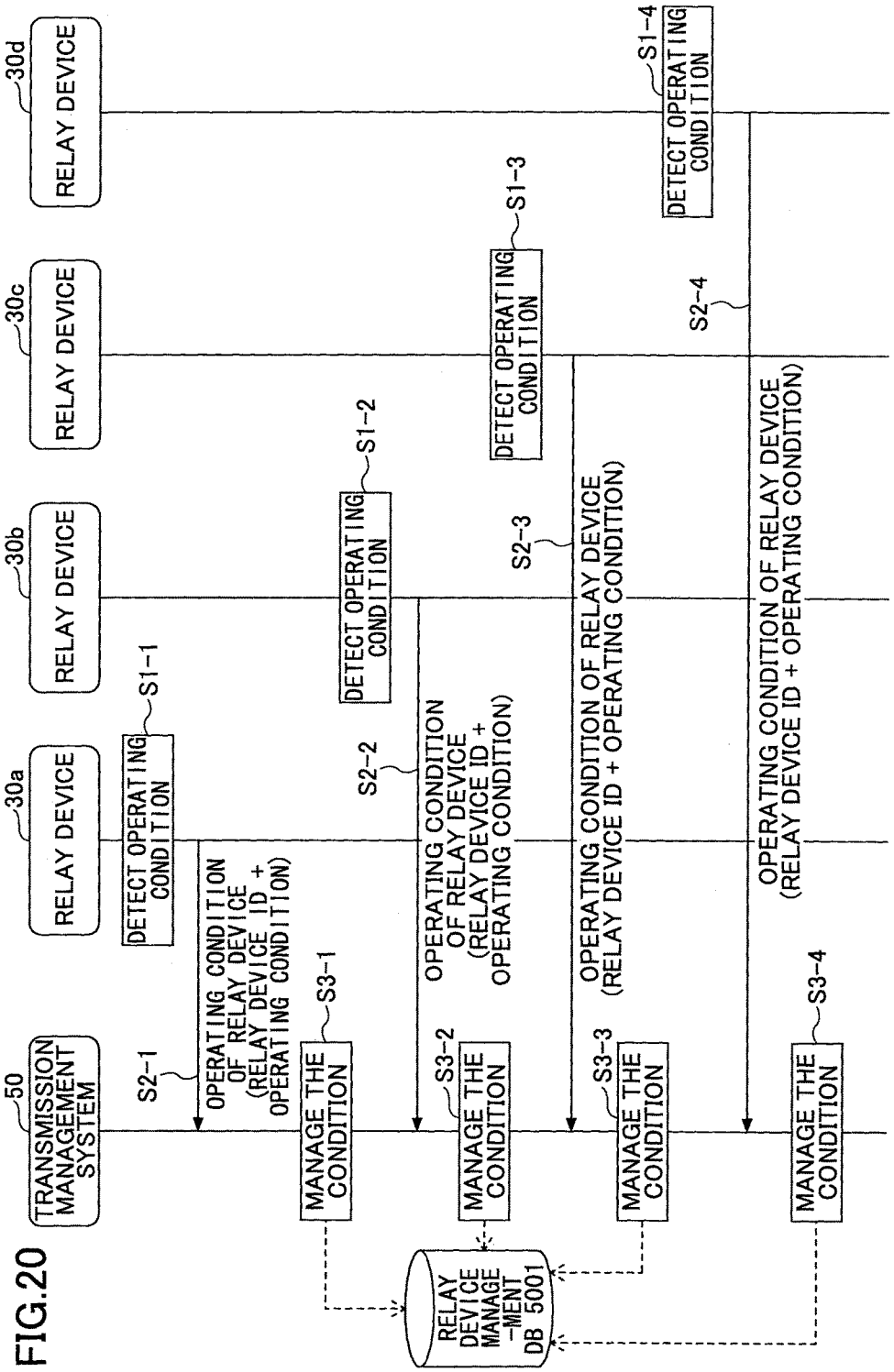
FIG. 20 is a sequence diagram for explaining a process to manage conditional information representing an operating condition of each relay device transmitted to the transmission management system from each relay device.
Figure 21:
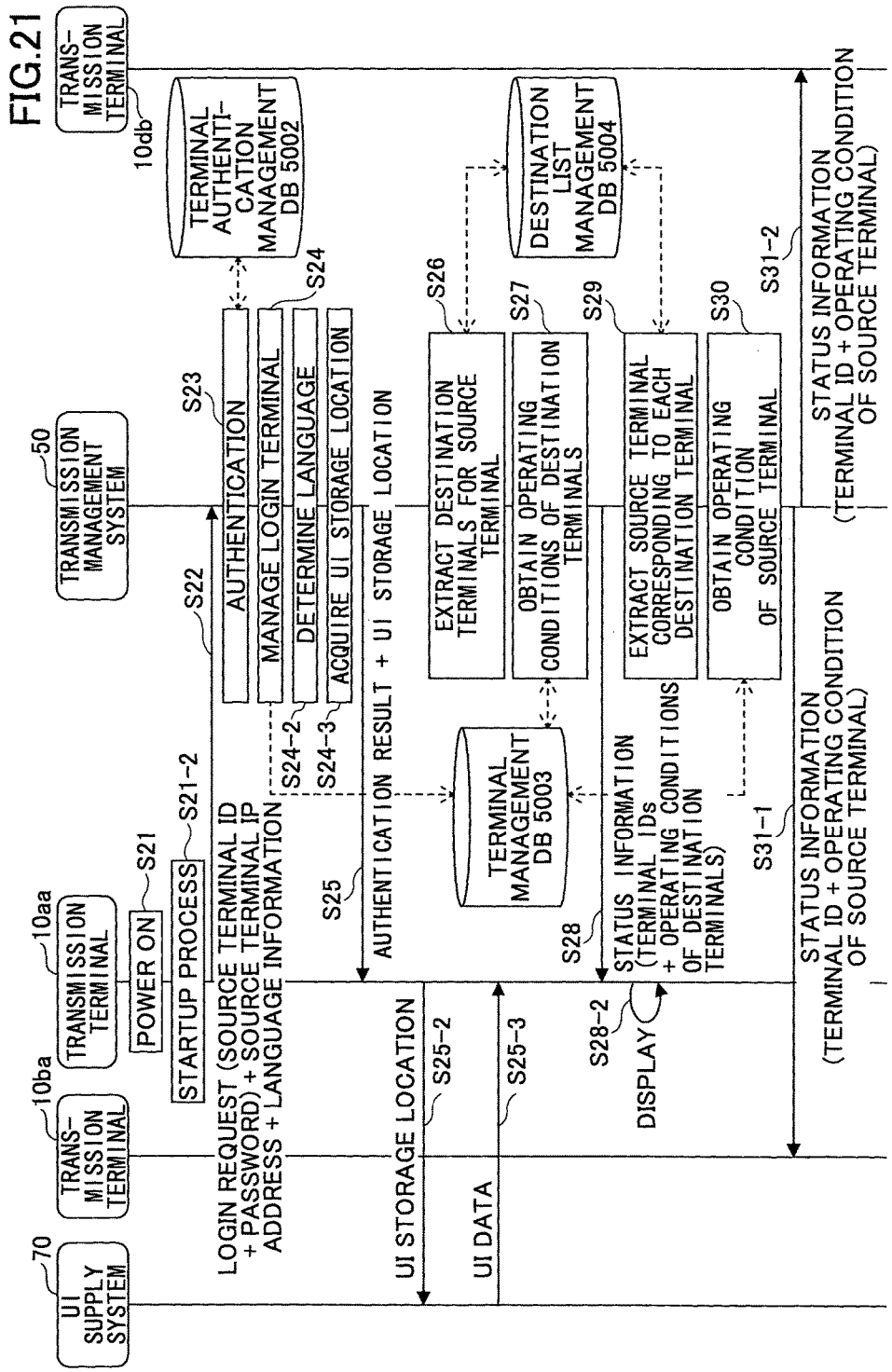
FIG. 21 is a sequence diagram for explaining a preparatory process to start communication between transmission terminals.
Figure 22:
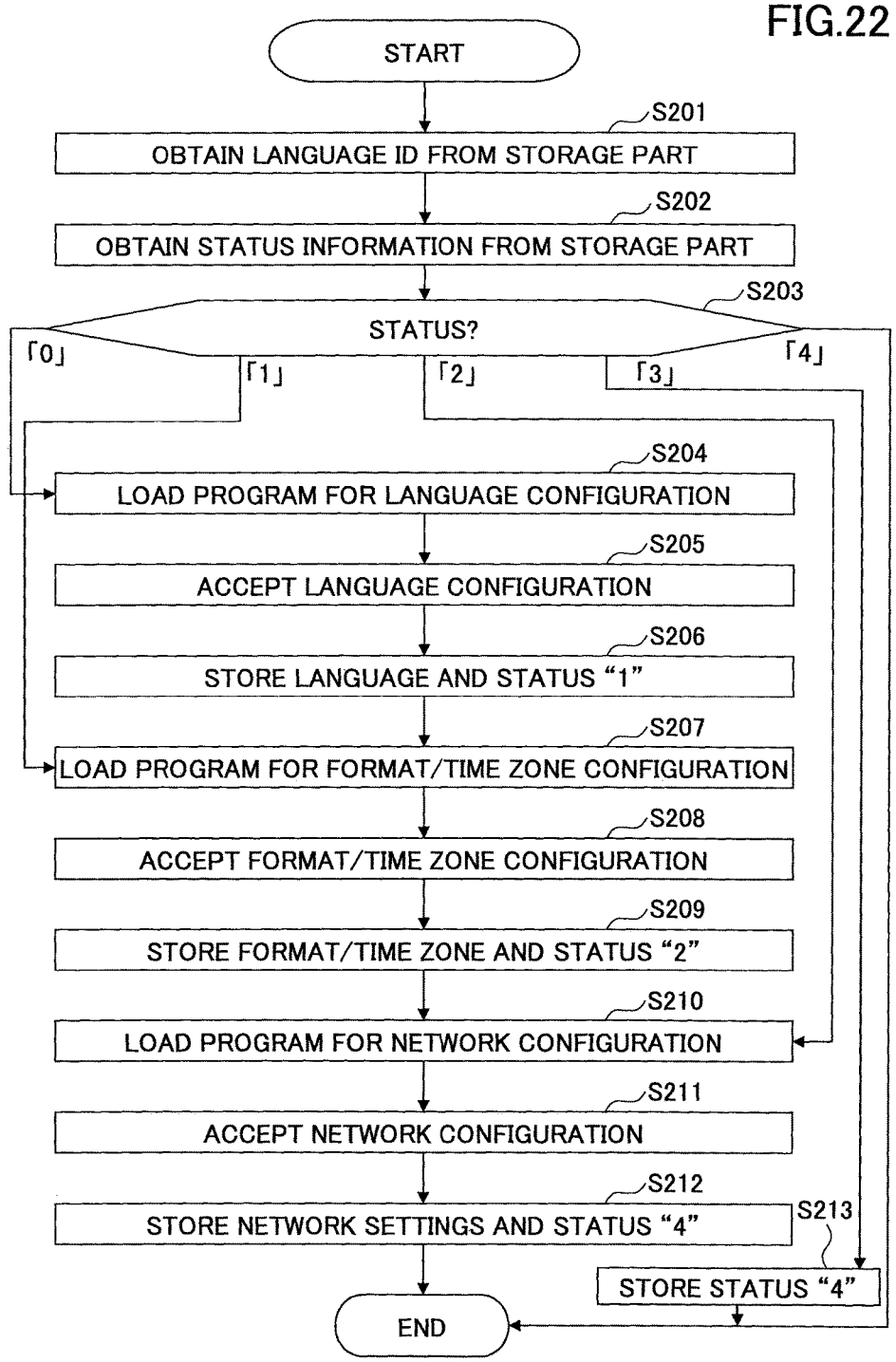
FIG. 22 is a flowchart for explaining a process to startup.
Figure 23A:
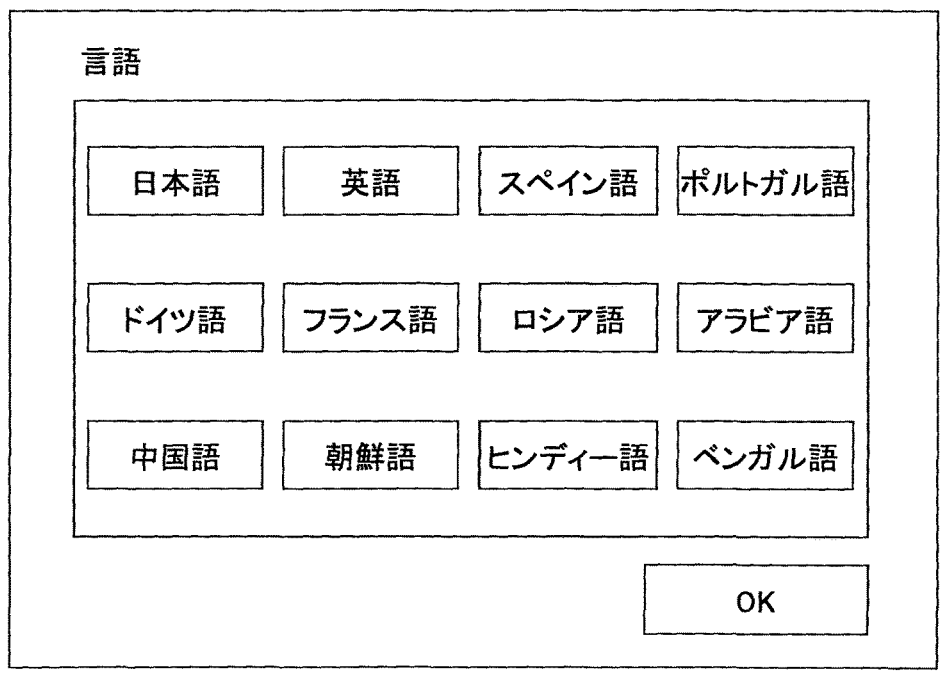
FIG. 23A is a diagram showing a menu displayed on the transmission terminal.
Figure 23B:
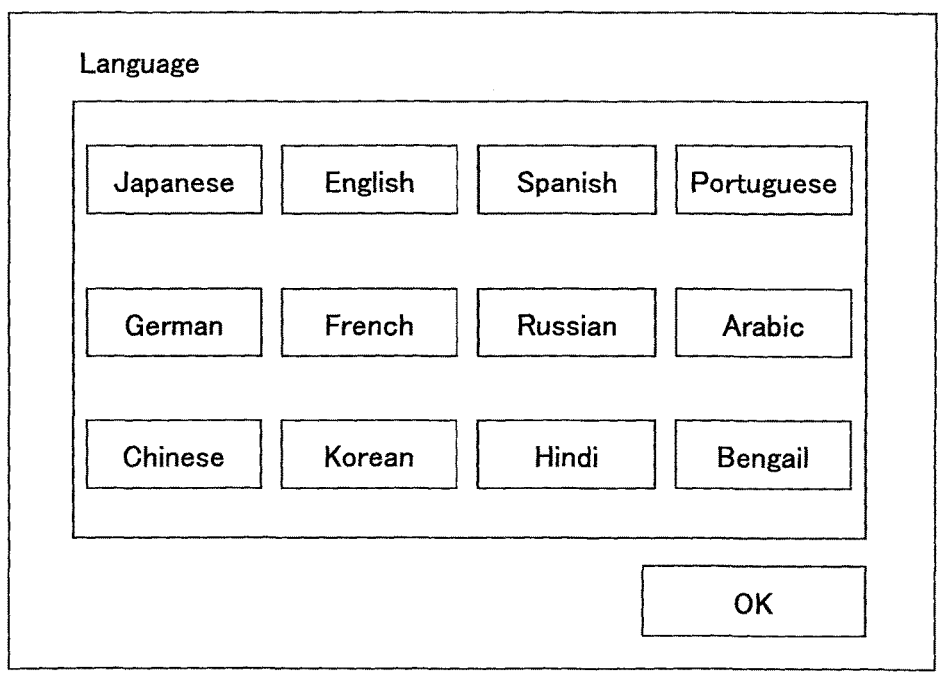
FIG. 23B is a diagram showing a menu displayed on the transmission terminal.
Figure 24:
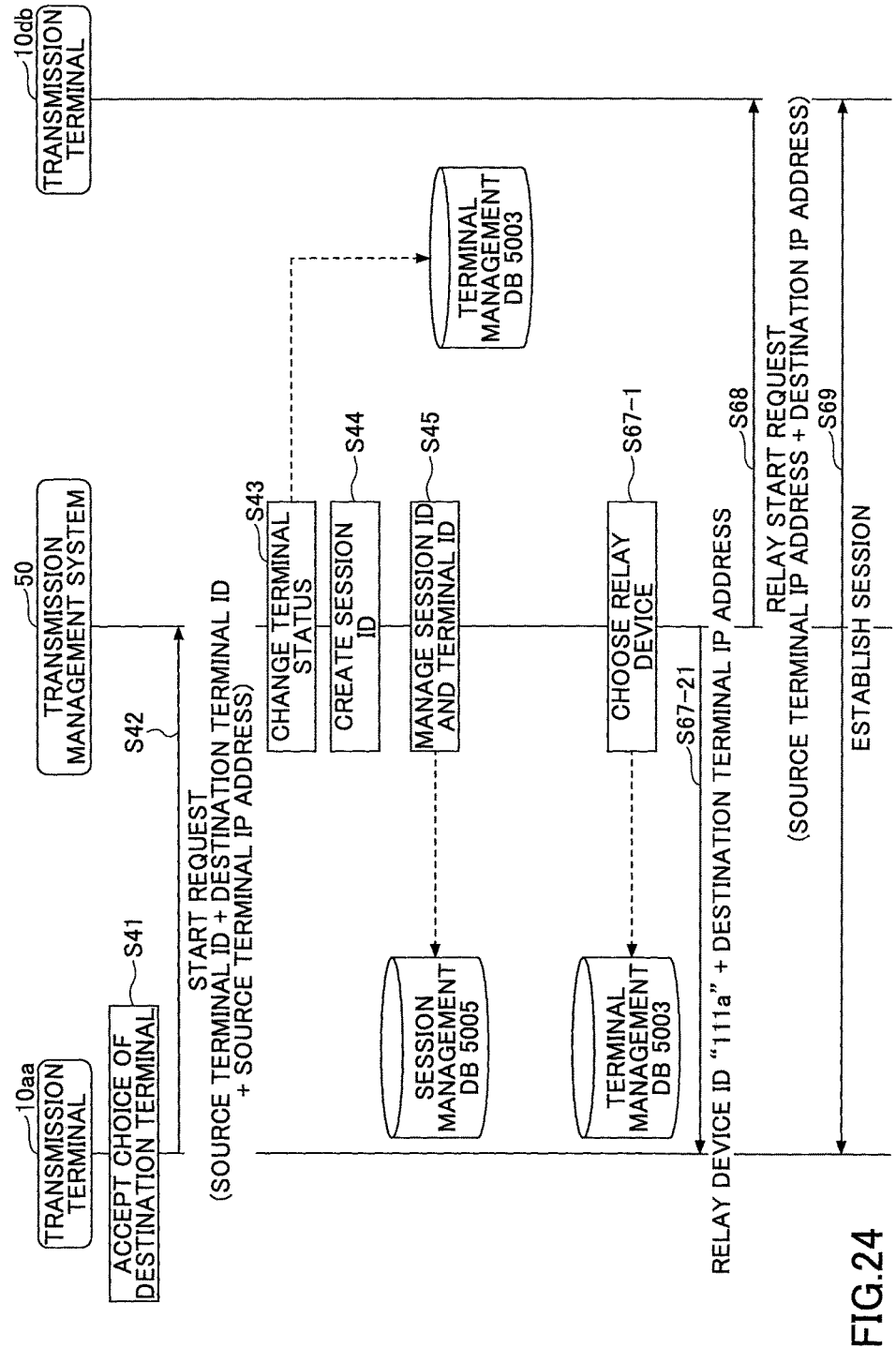
FIG. 24 is a sequence diagram for explaining a process for the transmission terminal to establish a session.
Figure 25:
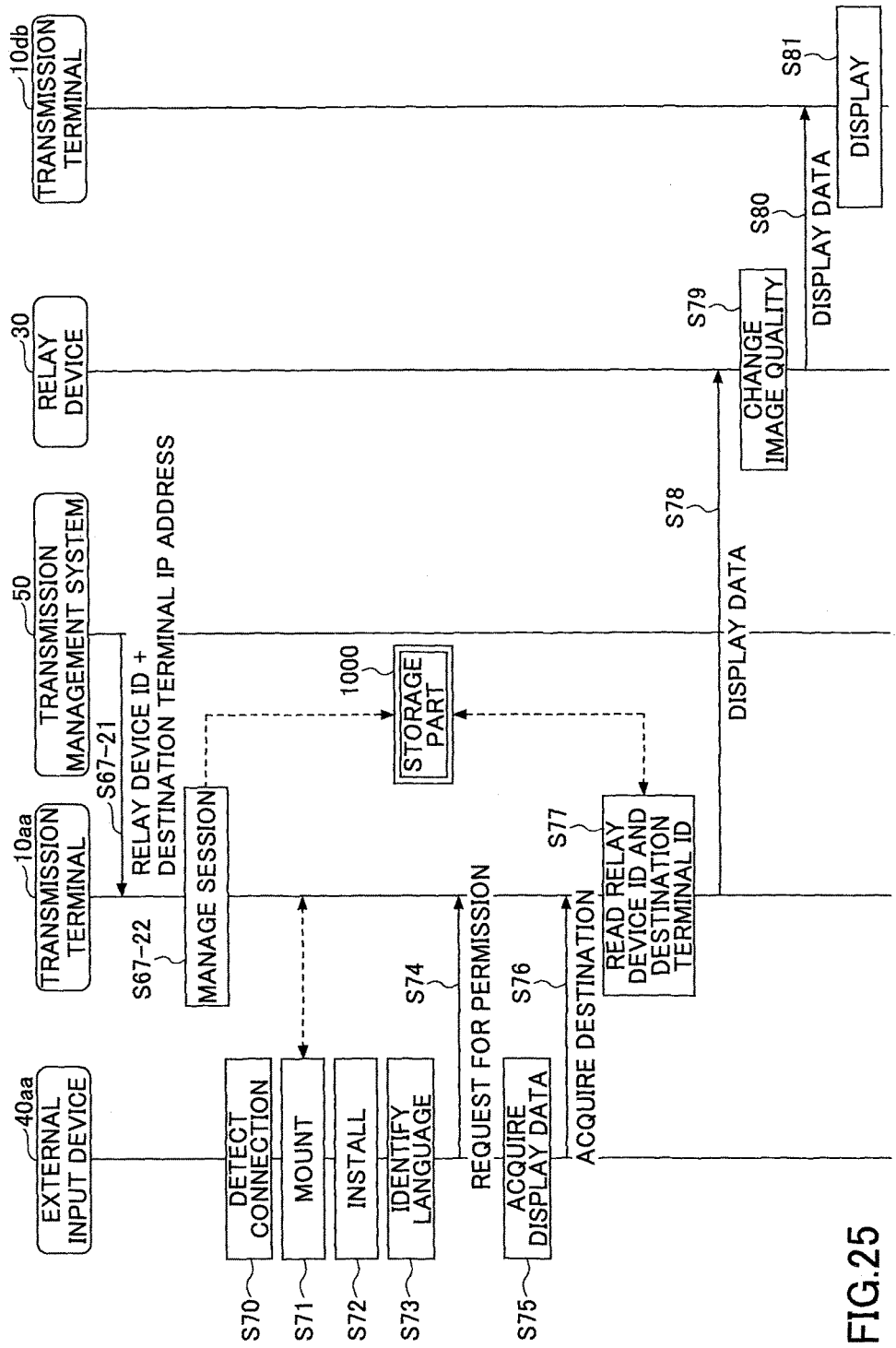
FIG. 25 is a sequence diagram for explaining a process to have another transmission terminal show display data displayed by the external input device.

The configuration and the functions of the transmission system 1 according to this embodiment are discussed above. In the following, with reference to FIGS. 20 through 25, a process performed in the transmission system 1 is discussed. FIG. 20 is a sequence diagram for explaining a process to manage conditional information representing an operating condition of each relay device 30 transmitted to the transmission management system 50 from each relay device 30. FIG. 21 is a sequence diagram for explaining a preparatory process to start communication between transmission terminals 10. FIG. 22 is a flowchart for explaining a process to startup. FIGS. 23A and 23B are diagrams showing menus displayed on the display 120 of the transmission terminal. FIG. 24 is a sequence diagram for explaining a process for the transmission terminal 10 to establish a session. FIG. 25 is a sequence diagram for explaining a process to have another transmission terminal show display data displayed by the external input device 40.

First, a process to manage status information representing statuses of each relay device 30 transmitted from the relay device to the management system 50 will be described with reference to FIG. 20. The state detection part 32 of each relay device 30 shown in FIG. 5 detects its operating condition periodically (steps S1-1-S1-4). Next, in order to manage the operating condition of each relay device 30 in the management system 50 in real time, the transmitter/receiver part 31 of each relay device 30 transmits the status information to the management system 50 via the communication network 2 periodically (steps S2-1-S2-4). The status information includes a relay device ID of each relay device 30 and an operating condition detected by the state detection part 32 of the relay device 30 using the relay device ID. Here, the relay devices (30*a*, 30*b*, 30*d*) operating correctly are "Online" in the transmission system 1. On the other hand, the relay device 30*c* is operating but a program to perform relaying functions is not working correctly. As a result, the relay device 30*c* is "Offline".

Next, the transmitter/receiver part 51 of the management system 50 receives the status information transmitted by each relay device 30, and stores the status information in the relay device management table (FIG. 9) in the storage part 5000 via the read/write processing part 59 to manage it (steps S3-1-S3-4). In this way, "Online", "Offline", or "Out of order" is stored for each relay device ID in the relay device management table as shown in FIG. 9. In addition, the receipt date/time at which the management system 50 receives the status information is stored for each relay device ID. If the management system 50 is not able to receive the status information from one of the relay devices 30, the operation condition and the receipt date/time may be blank in the relay device management table shown in FIG. 9. Alternatively, the operation condition and the receipt date/time may represent the previous operation condition or the receipt date/time.

With reference to FIG. 21, a preparatory process to start communication between transmission terminals is discussed below. First, when a user of the transmission terminal 10 switches ON the power switch 109 shown in FIG. 3, the operation input reception part 12 shown in FIG. 5 receives a power-ON signal to switch ON the power of the transmission terminal 10*aa* (step S21).

When the transmission terminal 10 is switched on, the start processing part 101*a* executes the process to startup (step S21-2). The detail of the process will be described later using FIG. 22.

The login request part 13 automatically transmits login request information indicating a request for logging into the transmission management system 50 (or transmission system 1) from the transmitter/receiver part 11 to the management system 50 via the communication network 2 (step S22). The login request information includes a terminal ID and a password for identifying the terminal 10*aa* which is described as the source terminal (the transmission terminal transmitting the login request information). The terminal ID and the password are data that are read from the storage unit 1000 via the read/write processing part 19 and then transmitted to the transmitter/receiver part 11. Note that when the login request information is transmitted from the terminal 10*aa* to the management system 50, the receiver side management system 50 may detect the IP address of the transmitter side terminal 10*aa*. In addition, language information representing a language configured by the language specification part 101*c* (acquired from the storage part 1000) in the process to startup is also transmitted to the transmission management system 50.

Next, the terminal authentication part 52 of the management system 50 authenticates the transmission terminal 10 based on whether the terminal ID and the password contained in the login request received via the transmitter/receiver part 51 are identical to those managed in the terminal authentication management DB 5002, by searching for the terminal ID and the password as search keys in the terminal authentication management table (FIG. 10) of the storage part 5000 (step S23).

The terminal authentication part 52 manages identical terminal IDs and identical passwords. Thus, when the terminal authentication part 52 determines that the received login request comes from the transmission terminal 10 having a valid access authorization, the state managing part 53 stores, in the terminal management table (FIG. 11), the terminal ID of the terminal 10aa, the operating state, the receipt date/time when the login request information has been received, and the IP address of the transmission terminal 10aa (step S24). Thus, the operating state "online", the receipt date/time "2009.11.10.13:40" (1:40 p.m., Nov. 10, 2009) and the terminal IP address "1.2.1.3" are managed in the terminal management table (FIG. 11) in association with the terminal ID "01aa".

The determination part 61 of the transmission management system 50 determines the language according to the language information transmitted with the login request information (step S24-2). The UI specification part 62 refers to the language table (FIG. 17) to acquire the UI storage location (step s24-3).

Subsequently, the transmitter/receiver part 51 of the management system 50 transmits authentication result obtained by the terminal authentication part 52 as well as the UI storage location acquired by the UI specification part 62 via the communication network 2 to the source terminal 10aa that has sent the login request (step S25). In the following, the case where the terminal authentication part 52 has determined that the terminal (e.g., in this case, the terminal 10aa) has the valid access authorization which will be described.

The transmission terminal 10aa which has received the authentication result and the UI storage location accesses and transmits a request to the UI supply system 70 indicated by the UI storage location for transmitting UI data (step S25-2). When the transmitter/receiver part 71 of the UI supply system 70 receives the request, the transmitter/receiver part 71 obtains the UI data from the information 72, and transmits the UI data to the transmission terminal 10aa (step S25-3).

The terminal extraction part 54 of the transmission management system 50 searches the destination list management table (FIG. 12) by the terminal ID "01aa" of the source terminal 10aa that has sent the login request as a search key, and retrieves the terminal IDs of potential destination terminals capable of communicating with the source terminal (i.e., the login request terminal 10aa) (step S26). In this example, terminal IDs "01ab", "01ba", and "01db" of the destination terminals (10ab, 10ba, and 10db) associated with the terminal ID "01aa" of the source terminal 10aa are extracted.

The terminal state acquisition part 55 searches the terminal management table (FIG. 11) by the terminal IDs ("01ab", "01ba", and "01db") of the destination terminals extracted by the terminal extraction part 54 as search keys, and retrieves the operating conditions of the destination terminals (10ab, 10ba, and 10db) extracted by the terminal extraction unit 54 based on the respective terminal IDs (step S27).

Subsequently, the transmitter/receiver part 51 transmits, via the communication network 2, to the login request terminal status information including terminal IDs used as the search keys in step S27 (i.e. "01ab", "01ba", and "01db") and the operating conditions of the potential destination terminals corresponding to the terminal IDs (i.e. "Offline", "Online", and "Online") (step S28). In this way, the source terminal (the login request terminal) 10aa may recognize the operating conditions "Offline", "Online", and "Online" of the transmission terminals ("01ab", 10ba, and "10db") with which the source terminal may communicate. The source terminal 10aa displays a menu (UI) according to the UI data received from the UI supply system 70 (Step S28-2).

FIG. 23A shows an example of the menu with Japanese UI data, and FIG. 23B shows an example of the menu with English UI. The user may choose a language in these menus. The transmission terminal 10 displays the list of languages the transmission terminal 10 supports. In FIG. 23A, the twelve languages are shown in Japanese, and in FIG. 24B, the twelve languages are shown in English. The kinds and number of languages are just examples. The operation input receiver part 12 accepts the language name chosen by the user, and store the language name in the storage part 1000.

The terminal extraction part 54 of the management system 50 searches the destination list management table (FIG. 12) by the terminal ID "01aa" of the source terminal 10aa that has sent the login request as a search key, and extracts terminal IDs of other source terminals that have been registered as potential destination terminals for the terminal ID "01aa" of the source terminal 10aa (step S29). In the destination list management table shown in FIG. 12, the terminal IDs to be extracted are "01ab", "01ba", and "01db".

Subsequently, the terminal state acquisition part 55 of the management system 50 searches the terminal management table (FIG. 11) by the terminal ID "01aa" of the login request terminal (the transmission terminal 10aa) that has sent the login request as a search key, and receives the operating condition of the login request terminal (the transmission terminal 10aa) which has sent the login request (step S30).

Subsequently, the transmitter/receiver part 51 transmits status information including the terminal ID "01aa", and the operating condition "online" of the source terminal 10aa obtained in step S29 to the transmission terminals "10ba" and "10db" the operating conditions of which are presented as "Online" in the terminal management table (FIG. 11) among the terminals (10ab, 10ba, and 10db) corresponding to the terminal IDs ("01ab", "01ba", and "01db") extracted in step S29 (steps S31-1 and S31-2). Note that when the transmitter/receiver part 51 transmits the status information to the terminals (10ba, 10db), the transmitter/receiver part 51 refers to the IP addresses of the transmission terminals managed in the terminal management table (FIG. 11) based on the respective terminal IDs ("01ba", "01db"). Accordingly, the terminal ID "01aa" and the operating condition "Online" of the login request terminal (the transmission terminal 10aa) may be transmitted to the transmission terminals (the transmission terminals 10db, 10ba) capable of communicating with the login request terminal (the transmission terminal 10aa).

In a similar manner as step S21, when the user on another transmission terminal 10 switches ON the power switch 109 shown in FIG. 4, the operation input reception part 12 shown in FIG. 5 receives a power-ON signal and subsequently the other transmission terminal 10 will perform a process similar to the above-described process of steps S22 through S31-1, 31-2. Thus, descriptions of the process of steps S22 through S31-1, 31-2 are omitted.

With reference to FIG. 22, a startup process performed by the transmission terminal 10 (step S21-2 in FIG. 21) is explained.

At the beginning of the startup process, the start processing part 101a obtains the language ID and the status information from the storage part 1000 (steps S201, S202). Next, the start processing part 101a performs different processes depending on a status (Step S203). The status is defined in FIG. 6.

When the status is "0", the start processing part 101a loads a program to implement the configuration UI part 101b for language configuration (Step S204). The configuration UI part 101b provides a UI for the user to choose a language, and accepts the choice (Step S205).

When the language configuration has been done, the start processing part 101a stores the language chosen by the user in the storage part 1000, and set the status "1" (step S206).

Next, the start processing part 101a loads a program to implement the configuration UI part 101b for format/time zone configuration (step S207). The configuration UI part 101b provides a UI for the user to choose a format and a time zone, and accepts the choices (Step S208).

When the format/time zone configuration has been done, the start processing part 101a stores the format and the time zone chosen by the user in the storage part 1000, and sets the status to "2" (step S209).

Next, the start processing part 101a loads a program to implement the configuration UI part 101b for network configuration (step S210). The configuration UI part 101b provides a UI for the user to input network settings, and accepts the input (Step S211).

When the network configuration has been done, the start processing part 101a stores the network settings entered by the user in the storage part 1000, and sets the status to "4" (step S212), and the start processing part 101a finishes the startup process.

When the status is "1", the process begins from step S207 (steps S204 through S206 are skipped).

When the status is "2", the process begins from step S210 (steps S204 through S209 are skipped).

When the status is "3", the start processing part 101a sets the status to "4" in the storage part 101, and finishes the startup process.

When the status is "4", the start processing part 101a does not execute any step, and finishes the startup process.

In this way, usability may be improved when the transmission terminal 10 is turned off during configuration such as language, format/time zone, and network configuration because the user does not need to do the configuration all over again.

With reference to FIG. 24, a process performed by the transmission terminal 1 to establish a session with another transmission terminal is explained. In this embodiment, the source terminal 10aa (the transmission terminal 10, which has sent a login request to the transmission management system 50), may communicate with either the transmission terminal 10ba or 10db, the operating condition of which is "Online" among the candidates for the destination terminal 10, according to the status information received in step S28 (FIG. 21). Thus, in the following, it is assumed that the user of the transmission terminal 10aa chooses the transmission terminal 10db to start communication.

When the user of the transmission terminal 10aa pushes the operation button 108 shown in FIG. 2 to choose the destination terminal 10db (the transmission terminal 10db), the operation input receive part 12 of the transmission terminal 10aa (FIG. 5) accepts the choice of the destination terminal 10db (step S41). The transmitter/receiver part 11 of the transmission terminal 10aa transmits a start request for starting communication with transmission terminal 10db, which includes the terminal ID "01aa" of the source terminal 10aa and the terminal ID "01db" of the destination terminal 10db to the transmission management system 50 (step S42). In this way, by receiving the start request, the transmitter/receiver part 51 of the management system 50 is able to obtain the IP address "1.2.1.3" of the source terminal 10aa which has transmitted the start request.

Next, based on the terminal ID "01aa" of the source terminal 10aa and the terminal ID "01db" of the destination terminal 10db included in the start request, the state management part 53 changes the fields of the records including the operating condition of the terminal IDs "01aa" and "01db" into "Busy" in the terminal management table of the terminal management DB 5003 (FIG. 11) (step S43). In this condition, both the source terminal 10aa and the destination terminal 10db become a "busy" state. When other transmission terminals 10 tries to connect to the communication terminal 10aa or 10db, a message indicating the transmission terminal 10aa or 10db is busy is played or displayed on the other transmission terminals 10.

The transmission management system 50 creates a session ID which is used to identify a session and choose a relay device 30 (step S44). The session management part 57 stores the session ID "se1" created in S44, the terminal ID "01aa" of the source terminal 10aa, and the terminal ID "01db" of the destination terminal 10db in the session management table (FIG. 13) of the storage part 5000 by associating them (step S45).

Next, the transmission management system 50 chooses one of the relay devices 30 for relaying communications between the source terminal 10aa and the destination terminal 10db based on the relay device management DB 5001 and the terminal management DB 5003.

Next, the session management part 57 of the transmission management system 50 stores the relay device ID "111a" of the chosen relay device in the field of "Relay Device ID" on the record including the session ID "se1" in the session management table (FIG. 13) of the session management DB 5005 (step S67-1). The transmission/receive unit 51 transmits the relay device ID "111a" and the IP address "1.3.2.4" of the destination terminal 10db to the source terminal 10aa (Step S67-21). The transmitter/receiver part 51 of the transmission management system 50 transmits to the relay device 30a a relay start request to start to relay communications (step S68). The relay start request includes IP addresses "1.2.1.3" and "1.3.2.4" of the source terminal 10aa and the destination terminal 10db. In this way, the relay device 30a establishes the session to transfer three kinds of image data and voice data (i.e. low resolution, middle resolution, and high resolution) between the transmission terminal 10aa and the transmission terminal 10db (step S69) so that the transmission terminals (10aa, 10db) start a video conference. Kinds of image data and voice data may be transferred more or less.

Each transmission terminal 10 may transfer the image data in accordance with H.264 standards (H.264/AVC, MPEG-4 part 10, MPEG-4 AVC, etc.) or its extension H.264/SVC or MPEG-2.

With reference to FIG. 25, a process is explained for outputting the display data indicating image displayed on the display 216 of the external input device 40 to the display 120 of another transmission terminal 10 after the relay device 30 is determined. In this example, the images displayed by the external input device 40aa which is connected to the transmission terminal 10aa are output to the transmission terminal 10db.

When the relay device 30 is determined above, the transmitter/receiver part 11 of the transmission terminal 10aa receives the relay device ID "111a" and the IP address "1.3.2.4" of the destination terminal 10db transmitted by the transmission management system 50 in S67-21 (FIG. 24). The read/write processing part 19 stores the received relay device ID "111a" and the IP address "1.3.2.4" in the storage part 1000 (step S67-22).

When the external input device 40aa is connected to the transmission terminal 10aa, the connection detection part 42 of the external input device 40aa detects the connection (step S70). When the external input device 40aa starts, the display control part 47 displays a screen which includes at least a whole area. When the connection detection part 42 detects the connection of the external input device 40aa and the transmission terminal 10aa, the mount part 48 mounts the storage part 1000 of the transmission terminal 10aa (step S71).

Next, the program acquisition part 43b acquires the program for the external input device stored in the storage part 1000 of the transmission terminal 10, and installs the program (Step S72). In this way, the external input device 40aa has the program for the external input device. Alternatively, the external input device 40aa holds the program in advance (i.e. without acquisition from the storage part 1000).

After step S72, the language determination part 44 identifies the language of a menu (step S73). The identification process is described later.

Next, the transmitter/receiver part 41 transmits to the transmission terminal 10aa a request for permission to transfer display data (step S74). When the transmitter/receiver part 41 receives a positive response to the request (i.e. transferring display data is permitted), the display data acquisition part 451 acquires the display data of image data displayed on the display 216 (step S75).

The display data transmission part 452 transmits the display data, the resolution of which is converted to the external data TX/RX part 18 of the transmission terminal 10aa (step S76).

Figure 26:
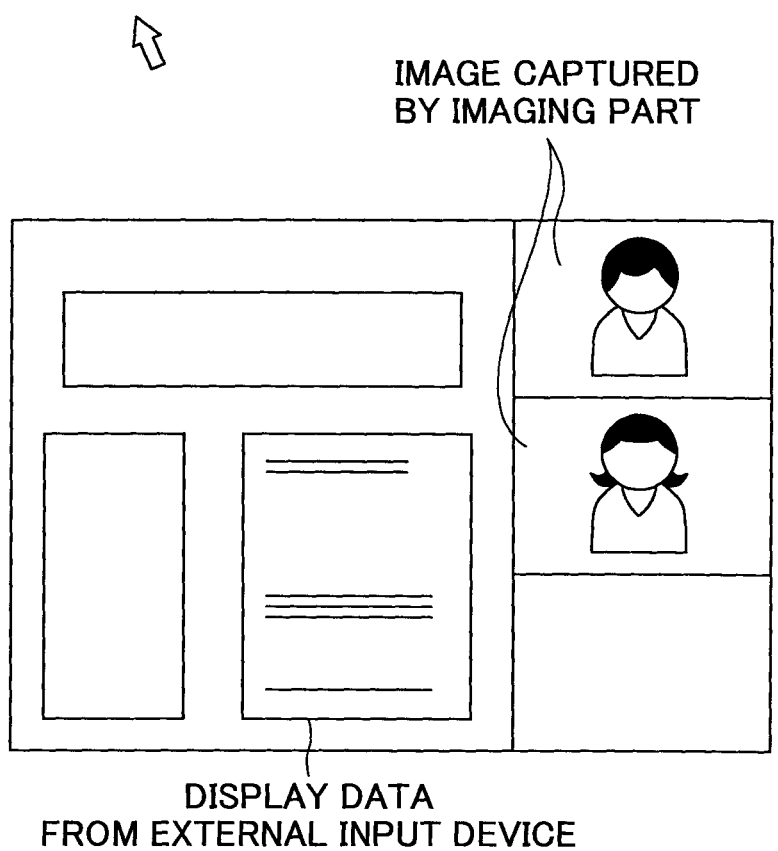
FIG. 26 is a diagram showing display data displayed on the transmission terminal.

When the external data TX/RX part 18 of the transmission terminal 10aa (i.e. the source terminal) receives the display data from the external input device 40aa, the read/write processing part 19 reads the relay device ID "111a" and the IP address "1.3.2.4" of the transmission terminal 10db as a destination, which are stored in the storage part 1000 (step S77). The transmitter/receiver part 11 transmits the display data, the resolution of which is converted, and the IP address "1.3.2.4" of the transmission terminal 10db as a destination to the relay device 30 identified by the relay device ID "111a" (step S78). When the relay device 30 receives the display data transmitted by the transmission terminal 10aa at step S78, the relay device 30 changes the resolution of the image data based on the IP address "1.3.2.4" (step S79), and transmits the display data to the transmission terminal 10db (step S80). When the transmitter/receiver part 11 of the transmission terminal 10db receives the display data transmitted by the relay device 30, the display control part 14b shows an image indicated by the display data on the display 120 (step S81). As shown in FIG. 26, the left part of the screen shows the display data from the external input device 400a, and the upper right part of the screen shows an image captured by the imaging part 14a of the transmission terminal 10aa and received by the transmitter/receiver part 11. In addition, the bottom right part of the screen shows an image captured by the imaging part 14a of the transmission terminal 10db.

Figure 27:
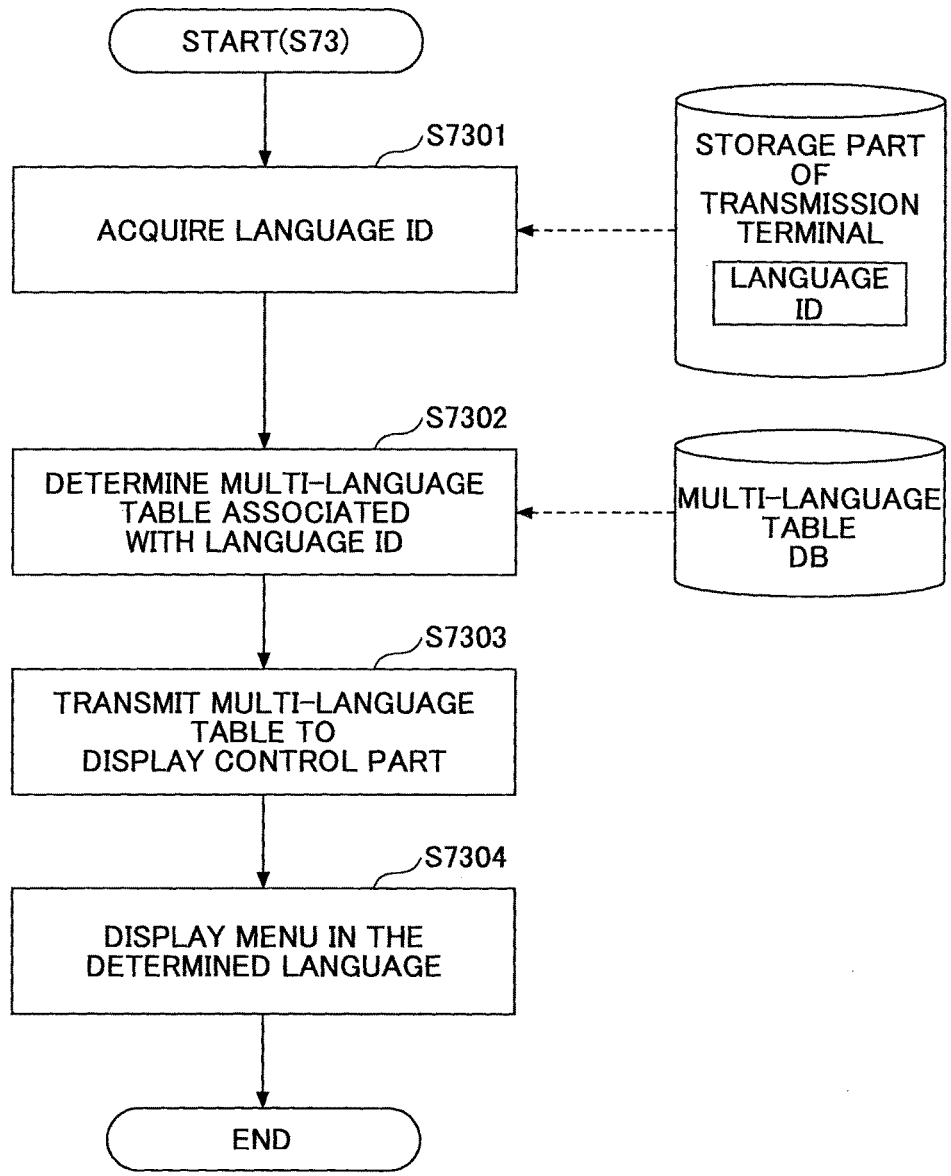
FIG. 27 is a flowchart for explaining a process performed by a language determination part to determine a language.

FIG. 27 shows a flowchart for explaining a process performed by the language determination part to determine a language.

When the installed program for the external input device is started, the language determination part 44 acquires a language ID from the storage part 1000 of the transmission terminal 10 (S7301). The language ID stored in the storage part 1000 has been configured by the user. Alternatively, both the program for the external input device and the language ID may be acquired and held in advance.

Next, the language determination part 44 identifies one of multi-language tables which are associated with the language ID by referring to the multi-language table DB 4001 (S7302). By determining with the multi-language table (i.e. the table number or the combination of the menu ID and display name), the language determination part 44 may identify the language.

The language determination part 44 transmits the multi-language table to the display control part 47 (S7303).

By referring to the identified multi-language table, the display control part 47 display the display name on a menu. Thus, the characters on the menu are displayed in the same language with the transmission terminal.

Sample Screen

Figure 28A:
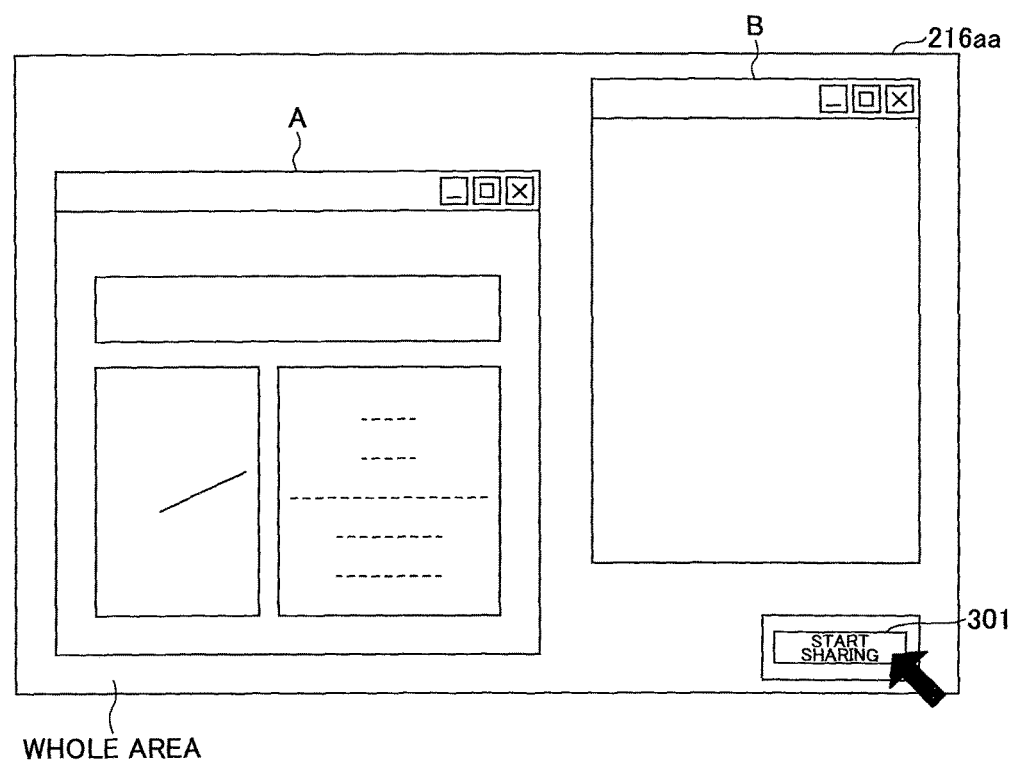
FIG. 28A is a diagram showing a desktop screen displayed on the external input device.

FIG. 28A shows an example of a desktop screen displayed on the display 216aa connected to the external input device 40aa. Here, English (language ID=en) is set for the language setting. The program for the external input device has been installed in the external input device 40aa. Periodically, or in response to a user's operation, the program displays a sharing control button 301 at the bottom right part of the desktop screen. The operation includes a click of the icon for the program for the external input device or a mouse over on the icon.

Figure 28B:
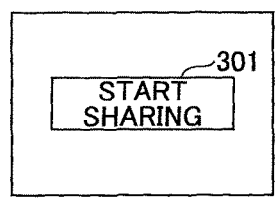
FIG. 28B is a diagram showing a desktop screen displayed on the external input device.
Figure 28C:
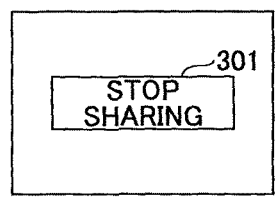
FIG. 28C is a diagram showing a desktop screen displayed on the external input device.

FIGS. 28B and 28C are examples of enlarged views of the sharing control button 301. FIG. 28B shows the sharing control button 301 displaying "Start sharing"; and FIG. 28C shows the sharing control button 301 displaying "Stop sharing". When the user clicks the sharing control button 301 shown in FIG. 28B with a pointing device, sharing of the display data displayed on the display 216aa of the external input device 40aa starts. While the display data is shared, the sharing control button 301 shown in FIG. 28C is displayed on the screen. When the user clicks the sharing control button 301 shown in FIG. 28C with a pointing device, sharing of the display data displayed on the display 216aa of the external input device 40aa stops (the display data is not transmitted to the transmission terminal 10aa).

The operation input acceptance part 46 as shown in FIG. 18 accepts the user's operation of clicking on the sharing control button 301. When the user clicks the sharing control button 301 displaying "Start sharing", the display data acquisition part 451 acquires the area specified by the user as the display data.

In the transmission system 1 according to this embodiment, the whole area or a part of the whole area of only a single external input device 40 is shared in responding to a click of the sharing control button 301 displaying "Start sharing". Thus, when a user clicks the sharing control button 301 displaying "Start sharing" shown in FIG. 28B while the display data on the display 216 of the external device 40aa used by a user aa is shared, the sharing of the display data on the display 216 stops without any operation for the sharing control button 301 displaying "Step sharing" by the user aa.

Figure 29A:
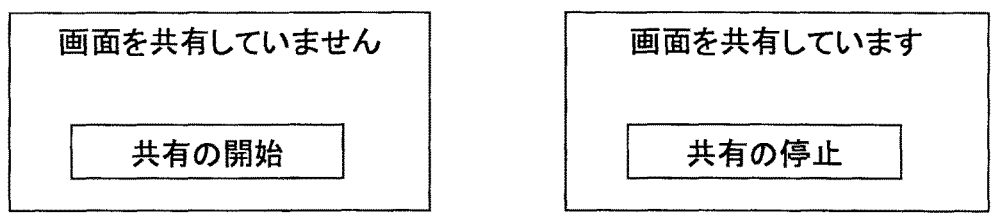
FIG. 29A is a diagram showing a sharing control button, depending on language IDs.
Figure 29B:
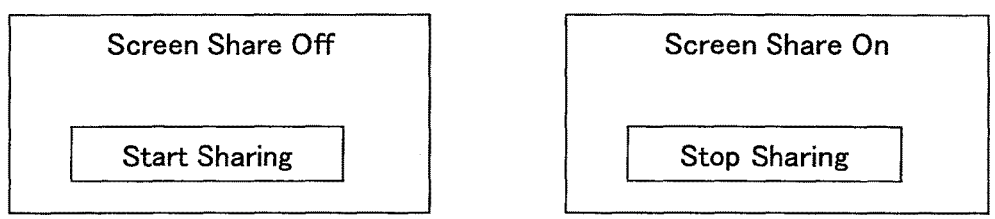
FIG. 29B is a diagram showing a sharing control button depending on language IDs.

FIGS. 29A and 29B show examples of the sharing control button 301 depending on the language ID. The same contents may be displayed in different languages depending on the language ID (e.g. ja or en).

Menu ID=MSG_IN_MEETING

Language ID=ja "画面を共有していません"
Language ID=en "Screen Share Off"
Menu ID=MSG_SHARING Language ID=ja "画面を共有しています"
Language ID=en "Screen Share On"
Menu ID=BTN_IN_MEETING Language ID=ja "共有の開始"
Language ID=en "Start Sharing"
Menu ID=BTN_SHARING Language ID=ja "共有の停止"
Language ID=en "Stop Sharing"

Figure 30B:
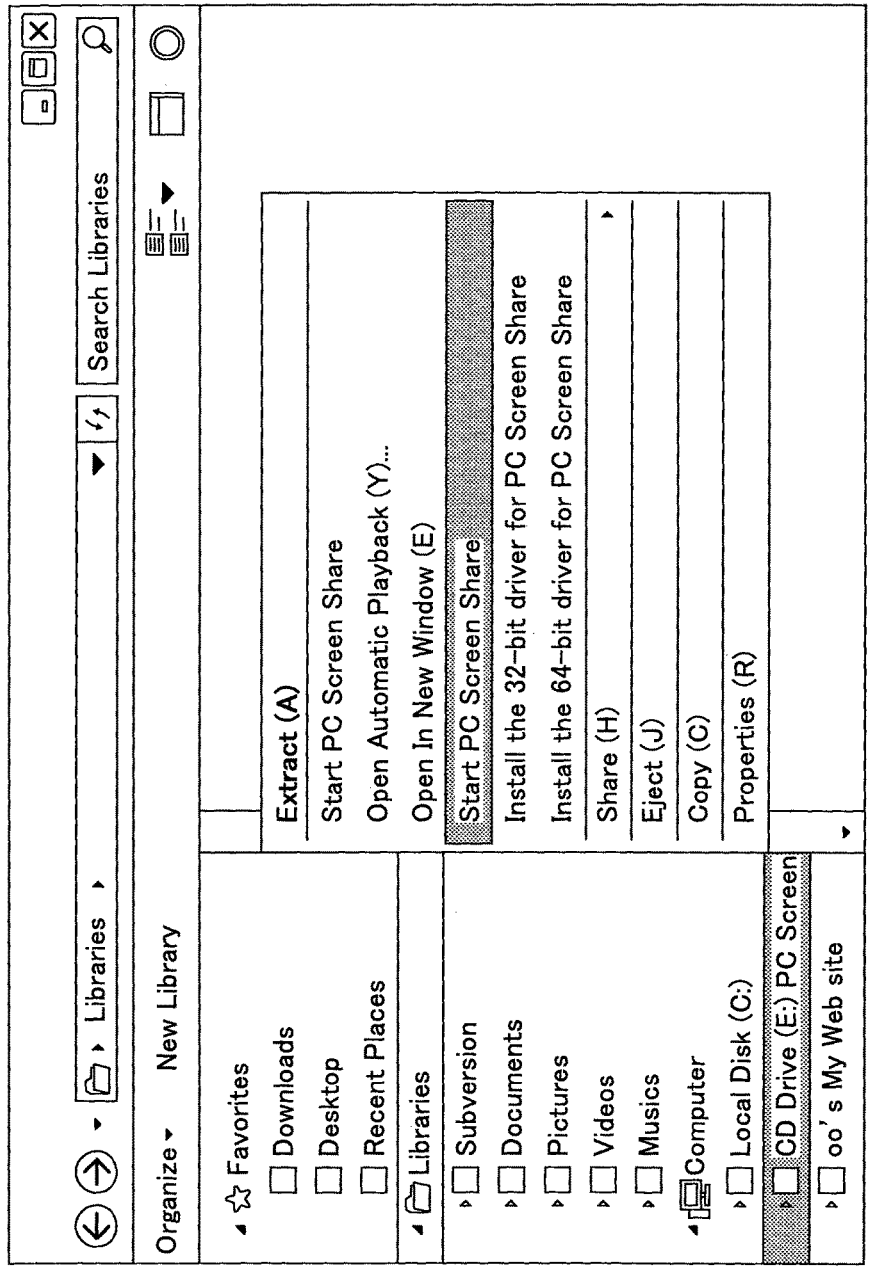
FIG. 30B is a diagram showing a context menu depending on language IDs.

FIGS. 30A and 30B show examples of context menus depending on the language ID. In addition to the screen displayed by the program for the external input device as shown in FIGS. 29A and 29B, the context menu to operate the program for the external input device is shown in the language corresponding to the language ID.

FIG. 30A shows a context menu displayed in Japanese (language ID=ja), and FIG. 30B shows a context menu displayed in English (language ID=en).

When the user clicks the right mouse button on the storage part 1000 of the transmission terminal, which is mounted on the external input device 40 (recognized as "CD Drive (E:) PC Screen Share" as shown in FIG. 30A), the context menu appears.

As shown in FIGS. 30A and 30B, the menus indicating the same content are displayed in different languages.
"Start PC Screen Share"
→"P C 画面共有ソフトウェアの起動"
"Install the 32-bit driver for PC Screen Share"
→"画面共有ドライバー32ビット版のインストール"
"Install the 64-bit driver for PC Screen Share"
→"P C画面共有ドライバ ─ 66ビット版のインストール"

In the context menu, other items which are not used for the program for the external input device are also displayed. These items are displayed by the operating system of the external input device 40, and not affected by the language ID. Thus, the program for the external input device 40 does not give any effects (e.g. changing the menu language) to other applications executed by the external input device 40.

In addition, drive names may be displayed in different languages depending on the setting.
"CD Drive (E:) PC Screen"
→"CDドライブ (E:) P C画面共有"

When the transmission terminal 10 is turned off or the connection between the external input device and the transmission terminal 10 is disconnected, the language ID is not stored in the external input device 40. When a different language ID is set to the transmission terminal connected to the external input device 40, the external input device 40 may display the menu in the present language. Therefore, the menu language may be changed automatically depending on the language set to the transmission terminal 10 connected to the external input device 40.

As stated above, the transmission terminal 10 according to this embodiment may display the menu items for the external input device 40 in the same language with the one set for the transmission terminal.

Other Examples Besides Transmission Terminal and External Input Device

The examples for the transmission terminal 10 and the external input device 40 are illustrated above. However, any other information processing device, which displays characters on a display or a projector, may be used as a transmission terminal 10 or an external input device 40.

For example, a combination of an external input device 40 and a digital still camera, an external input device 40 and a digital video camera, or an external input device 40 and a projector is expected. The user may configure resolution or brightness of the digital camera while looking at the menu. Generally, the menu language may be set by the user manually. For example, when the user connects the digital camera with the external input device 40 to copy image data stored in the digital camera, a menu of an application executed on the external input device 40 may be displayed in the language set for the digital camera. Much the same is true for the video camera or the projector.

The configuration set in the transmission terminal and reflected by the external input device 40 is not limited to the language. For example, when a time zone is configured in the transmission terminal, the program for the external input device executed on the external input device 40 uses the same time zone with the transmission terminal only while the transmission terminal is connected. In this way, it is convenient for the user to confirm the current time.

In addition, when a color tone of the menu displayed on the transmission terminal (e.g. a specific color or warm or cold color, etc.) is configured, the menu of the external input device 40 may be displayed with the same color tone. Furthermore, when a font of the menu displayed on the transmission terminal is configured, the menu of the external input device 40 may be displayed with the same font.

The present application is based upon and claims the benefit of priority of Japanese Patent Application No. 2013-104512 filed on May 16, 2013, the entire contents of which are incorporated herein by reference.

CITATION LIST

Patent Literature

[Patent Document 1] Japanese Laid-open Patent Publication No. 2012-134941

The invention claimed is:

1. A non-transitory computer readable medium including computer executable instructions for causing an information processing device connected to transmission terminal to perform a method comprising:
   when detecting a connection to the transmission terminal, automatically acquiring from the transmission terminal a display setting representing a setting of a language for one or more user interface components displayed by the transmission terminal;
   after establishing the connection to the transmission terminal, displaying, in response to a user input, a context menu on a screen of the information processing device that includes at least (i) a first menu corresponding to a particular program and allowing the user to select the particular program to be acquired from the transmission terminal, the particular program being used to perform transmitting display data, representing at least part of the screen of the information processing device, to the transmission terminal and (ii) other menus, the first menu being automatically displayed by the information processing device in the language represented by the selected display setting acquired from the transmission terminal, and the other menus are displayed in the language originally specified by the operating system of the information processing device;

acquiring, from the transmission terminal, the particular program when the user selects the particular program from the first menu; and activating the particular program to perform transmitting the display data, representing the at least part of the screen of the information processing device, to the transmission terminal, wherein the first menu includes a selectable item for installing the particular program onto the information processing device, the selectable item being automatically displayed by the information processing device in the language represented by the selected display setting acquired from the transmission terminal.

2. An information processing system comprising:
an information processing device; and
transmission terminal connected to the information processing device;
wherein transmission terminal includes a memory configured to store a display setting representing a setting of a language for one or more user interface components displayed by the transmission terminal; and
wherein the information processing device includes processing circuitry configured to:
when detecting a connection to the transmission terminal, automatically acquire from the transmission terminal the display setting representing a setting of a language for one or more user interface components displayed by the transmission terminal;
after establishing the connection to the transmission terminal, display in response to a user input, a context menu on a screen of the information processing device that includes at least (i) a first menu corresponding to a particular program and allowing the user to select the particular program to be acquired from the transmission terminal, the particular program being used to perform transmitting display data, representing at least part of the screen of the information processing device, to the transmission terminal and (ii) other menus, the first menu being automatically displayed by the information processing device in the language represented by the selected display setting acquired from the transmission terminal, and the other menus are displayed in the language originally specified by the operating system of the information processing device;
acquire, from the transmission terminal, the particular program when the user selects the particular program from the first menu; and
activate the particular program to perform transmitting the display data, representing the at least part of the screen of the information processing device, to the transmission terminal,
wherein the first menu includes a selectable item for installing the particular program onto the information processing device, the selectable item being automatically displayed by the information processing device in the language represented by the selected display setting acquired from the transmission terminal.

3. The information processing system as claimed in claim 2, wherein the transmission terminal further includes processing circuitry configured to transmit the display data received from the information processing device to another transmission terminal via a network.

4. The information processing system according to claim 3, wherein the transmission terminal transmits the display data received from the information processing device to the other transmission terminal via the network as part of an ongoing video communication session between the transmission terminal and the other transmission terminal.

5. The information processing system according to claim 2, wherein information processing device is configured to mount a memory area of the transmission terminal upon establishing the connection with the transmission terminal in order to allow access to acquiring the particular program from the transmission terminal.

6. The information processing system according to claim 2, wherein the first menu includes a selectable item for activating the particular program to perform transmitting the display data to the transmission terminal, the selectable item being automatically displayed by the information processing device in the language represented by the selected display setting acquired from the transmission terminal.

7. An information processing device connected to a transmission terminal comprising:
processing circuitry configured to
when detecting a connection to the transmission terminal, automatically acquire from the transmission terminal a display setting representing a setting of a language for one or more user interface components displayed by the transmission terminal;
after establishing the connection to the transmission terminal, display in response to a user input, a context menu on a screen of the information processing device that includes at least (i) a first menu corresponding to a particular program and allowing the user to select the particular program to be acquired from the transmission terminal, the particular program being used to perform transmitting display data, representing at least part of the screen of the information processing device, to the transmission terminal and (ii) other menus, the first menu being automatically displayed by the information processing device in the language represented by the selected display setting acquired from the transmission terminal, and the other menus are displayed in the language originally specified by the operating system of the information processing device;
acquire, from the transmission terminal, the particular program when the user selects the particular program from the first menu; and
activate the particular program to perform transmitting the display data, representing the at least part of the screen of the information processing apparatus, to the transmission terminal,
wherein the first menu includes a selectable item for installing the particular program onto the information processing device, the selectable item being automatically displayed by the information processing device in the language represented by the selected display setting acquired from the transmission terminal.

* * * * *